(12) United States Patent
O'Neil et al.

(10) Patent No.: US 9,534,718 B2
(45) Date of Patent: Jan. 3, 2017

(54) PIPE JOINT RESTRAINT

(75) Inventors: Virgil E. O'Neil, Vista, CA (US); James F. LeStage, Vista, CA (US)

(73) Assignee: Securus, Inc., Poway, CA (US)

( * ) Notice: Subject to any disclaimer, the term of this patent is extended or adjusted under 35 U.S.C. 154(b) by 1273 days.

(21) Appl. No.: 12/730,719

(22) Filed: Mar. 24, 2010

(65) Prior Publication Data
US 2010/0244437 A1    Sep. 30, 2010

Related U.S. Application Data

(60) Provisional application No. 61/163,398, filed on Mar. 25, 2009.

(51) Int. Cl.
| F16L 43/02 | (2006.01) |
| --- | --- |
| F16L 35/00 | (2006.01) |
| F16L 21/06 | (2006.01) |
| F16L 55/00 | (2006.01) |

(52) U.S. Cl.
CPC ............. *F16L 35/00* (2013.01); *F16L 21/065* (2013.01); *F16L 43/02* (2013.01); *F16L 55/00* (2013.01)

(58) Field of Classification Search
CPC ...... F16L 21/08; F16L 27/111; F16L 27/1085; F16L 55/005
USPC .................... 285/133.5, 135.2, 179, 180, 114
See application file for complete search history.

(56) References Cited

U.S. PATENT DOCUMENTS

| 993,934 | A * | 5/1911 | Witzenmann | ........... F16L 27/111 285/114 |
| --- | --- | --- | --- | --- |
| 1,371,981 | A * | 3/1921 | Rose | ....................... F16L 11/15 285/114 |
| 1,891,874 | A * | 12/1932 | Elkins | ........................... 403/378 |
| 2,748,804 | A * | 6/1956 | Guarnaschelli | ......... F16L 11/15 285/114 |
| 2,853,262 | A * | 9/1958 | Reimann | ................. F16L 3/003 285/114 |
| 3,565,468 | A | 2/1971 | Garrett | |
| 4,093,282 | A * | 6/1978 | Kyriakodis | ............. F16L 33/08 285/114 |
| 4,155,574 | A | 5/1979 | Hulsey | |
| 4,487,438 | A | 12/1984 | Sweeney | |

(Continued)

FOREIGN PATENT DOCUMENTS

GB         735271         8/1955

OTHER PUBLICATIONS

Technical Advisory Group of the Cast Iron Soil Pipe Institute, Cast Iron Soil Pipe and Fittings Handbook,Twelfth Printing 2006, pp. Intro, i-vii, and 44-57, Cast Iron Soil Pipe Institute, United States of America.

*Primary Examiner* — David E Bochna
(74) *Attorney, Agent, or Firm* — Stetina Brunda Garred & Brucker; Lowell Anderson

(57) ABSTRACT

A joint restraint is provided for a curved pipe joint having a curved pipe section joining two adjacent pipe sections. The pipes are joined using tubular sleeves held by hose clamps to form fluid tight seals, with two clamps on each end of the curved pipe sections and two clamps on each proximal end of the adjacent pipe sections. An inner strap extends between and fastens to one of the clamps on each adjacent pipe section forming a chord of an arc. An outer strap extends along an outer periphery of the joined pipes and fastens to the other clamps on each adjacent pipe section. The straps are in a plane through a center of the flow path of the joined pipes.

24 Claims, 17 Drawing Sheets

(56) References Cited

U.S. PATENT DOCUMENTS

| | | | |
|---|---|---|---|
| 4,492,393 A | | 1/1985 | Schaub |
| 4,889,167 A | | 12/1989 | Morris |
| 5,026,096 A | * | 6/1991 | Lutz, II .................. F16L 21/08 285/114 |
| 5,368,337 A | * | 11/1994 | Torres .................... F16L 33/08 285/114 |
| 5,431,458 A | | 7/1995 | Schaub et al. |
| 5,507,533 A | * | 4/1996 | Mumma ............... F16L 55/005 285/114 |
| 5,718,462 A | * | 2/1998 | Woods .......................... 285/236 |
| 5,741,029 A | * | 4/1998 | Wilson ................... F16L 25/14 285/114 |
| 5,873,608 A | * | 2/1999 | Tharp ................... F16L 55/005 285/114 |
| 6,065,784 A | | 5/2000 | Lundstorm |
| 6,139,068 A | | 10/2000 | Burress et al. |
| 6,145,896 A | | 11/2000 | Vitel et al. |
| 6,354,937 B1 | * | 3/2002 | Crook ................. F24F 13/0209 285/114 |
| 7,118,137 B2 | | 10/2006 | Deremiah |
| 7,552,949 B2 | | 6/2009 | Riordan, III et al. |
| 7,731,242 B2 | | 6/2010 | Coscarella |
| 7,802,823 B2 | * | 9/2010 | Piantoni ............... F16L 55/005 285/114 |

\* cited by examiner

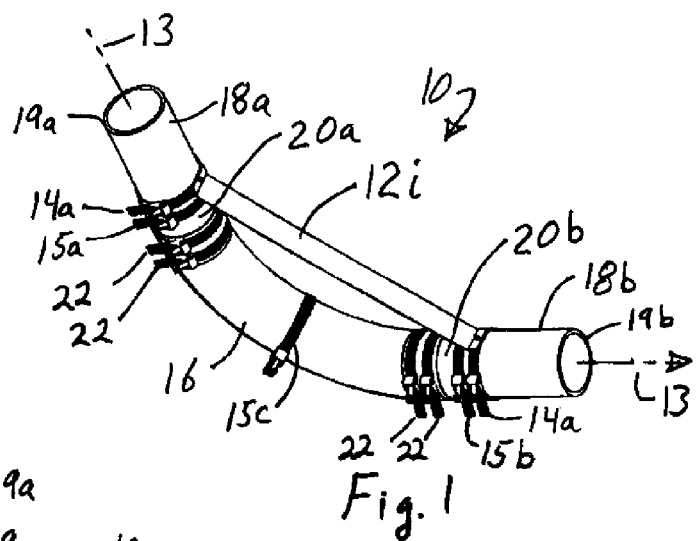
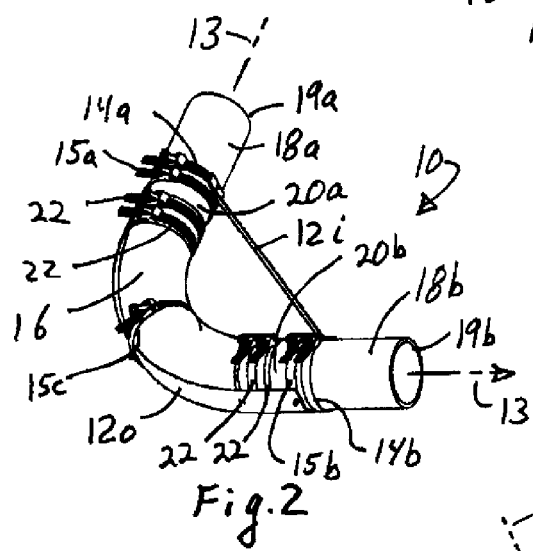
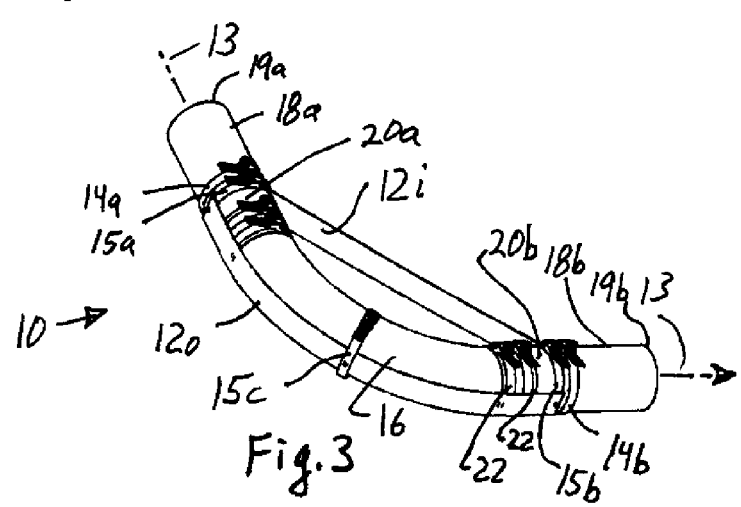

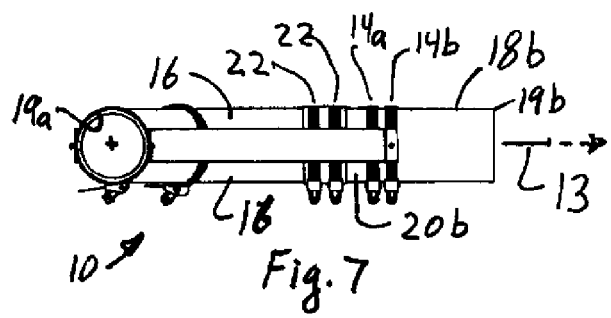
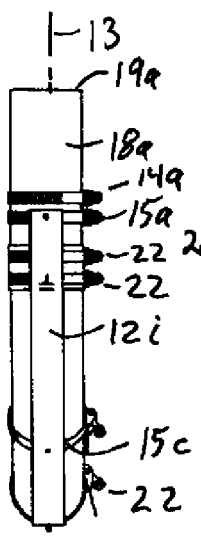
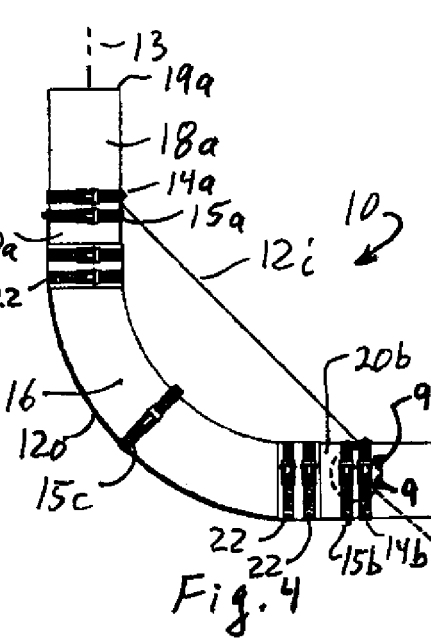
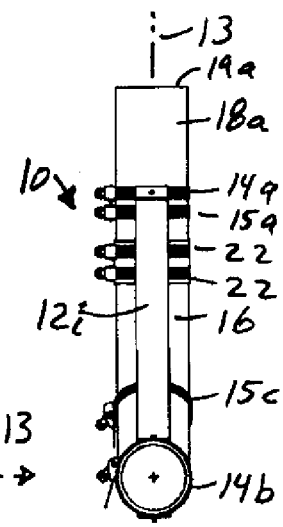
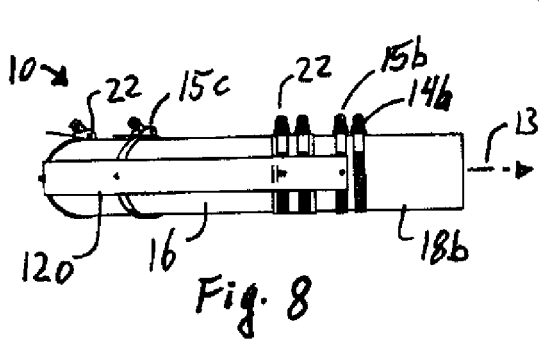
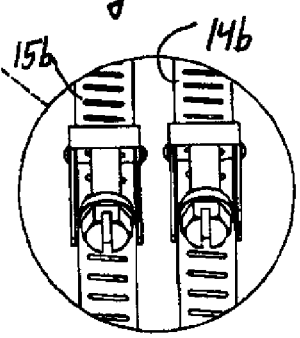

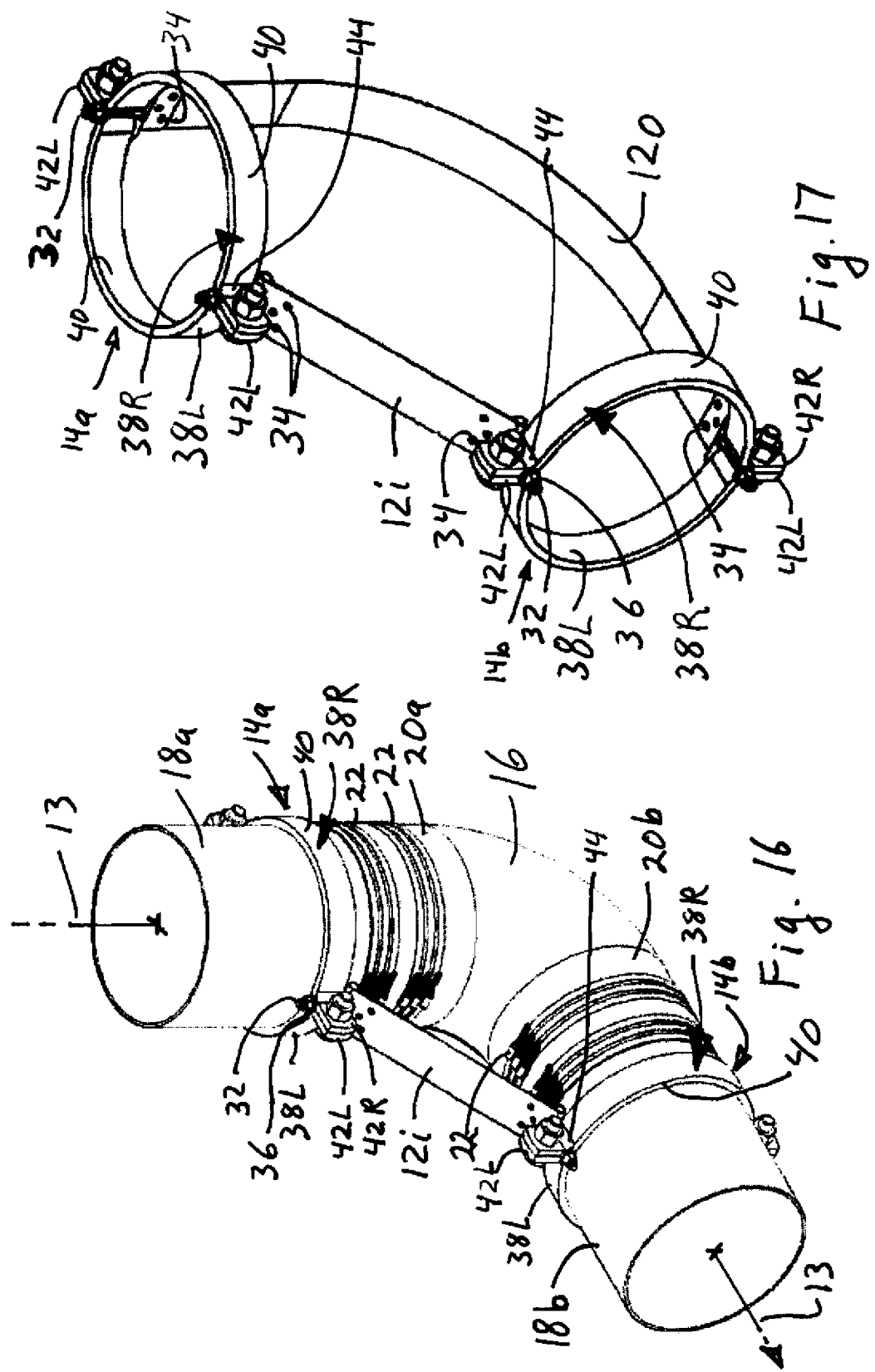

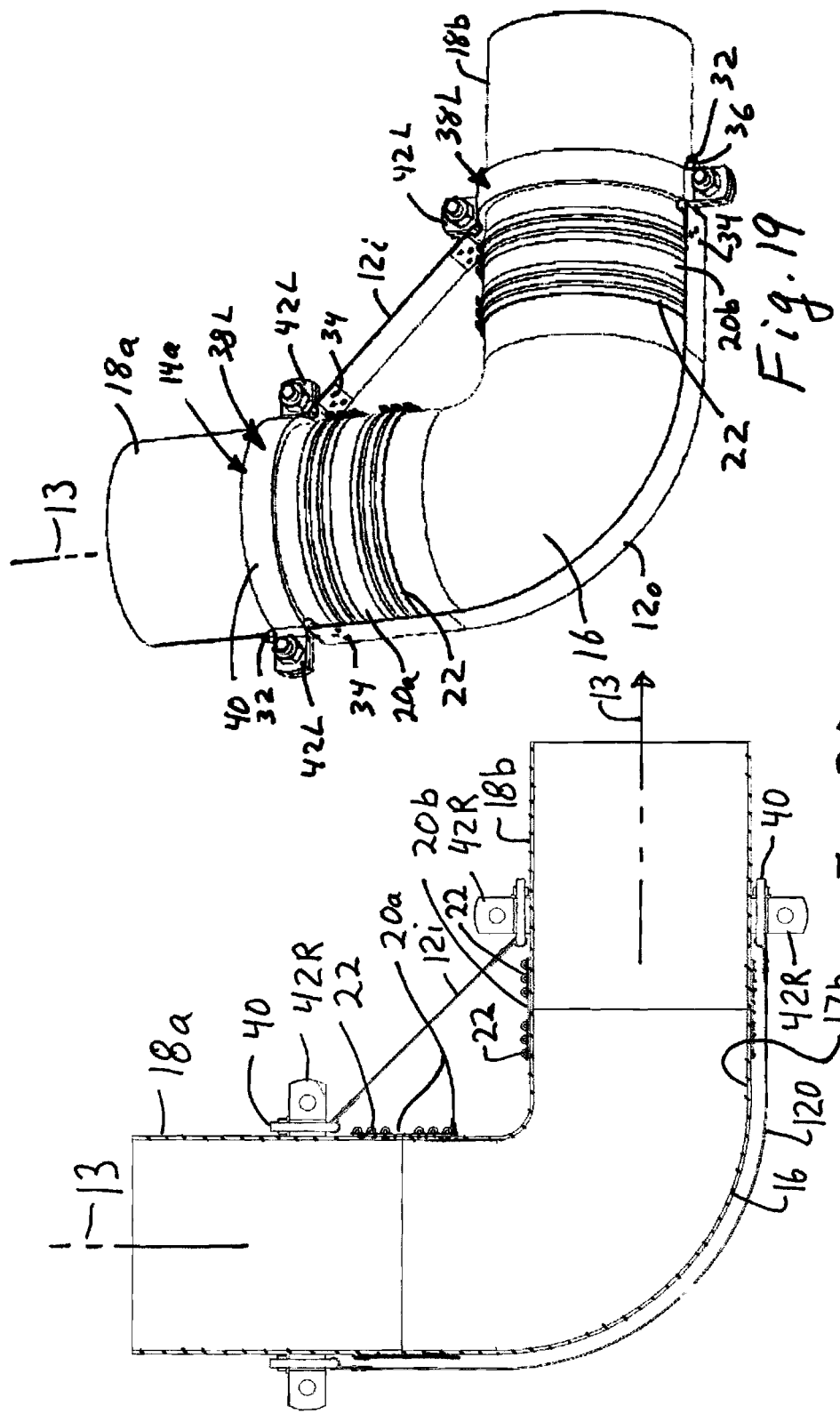

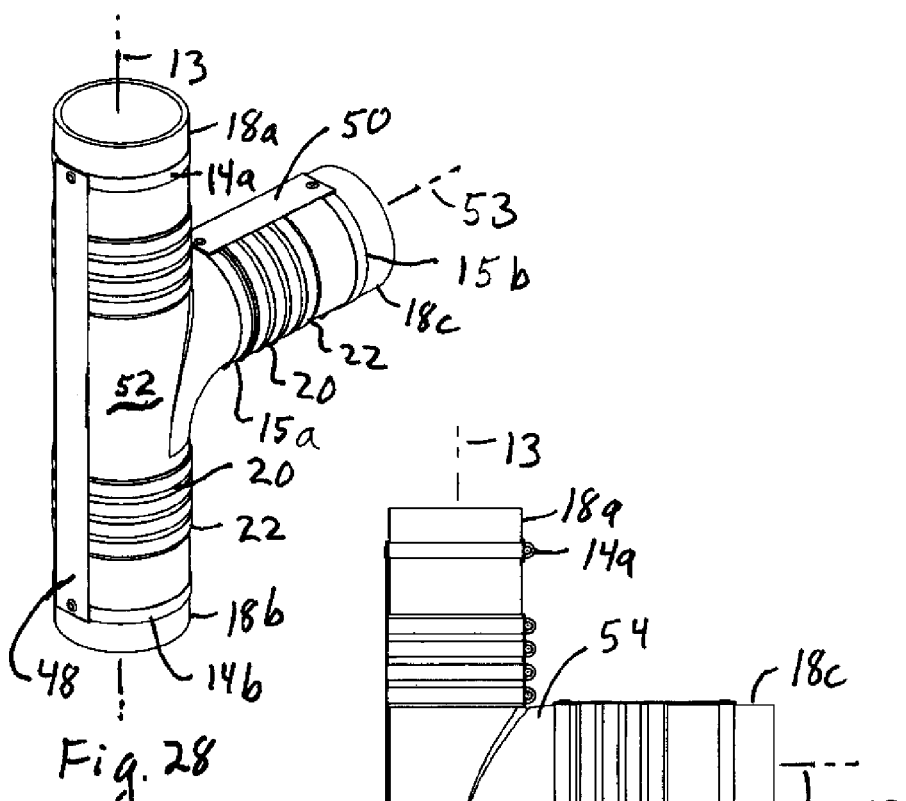
Fig. 28
Fig. 29
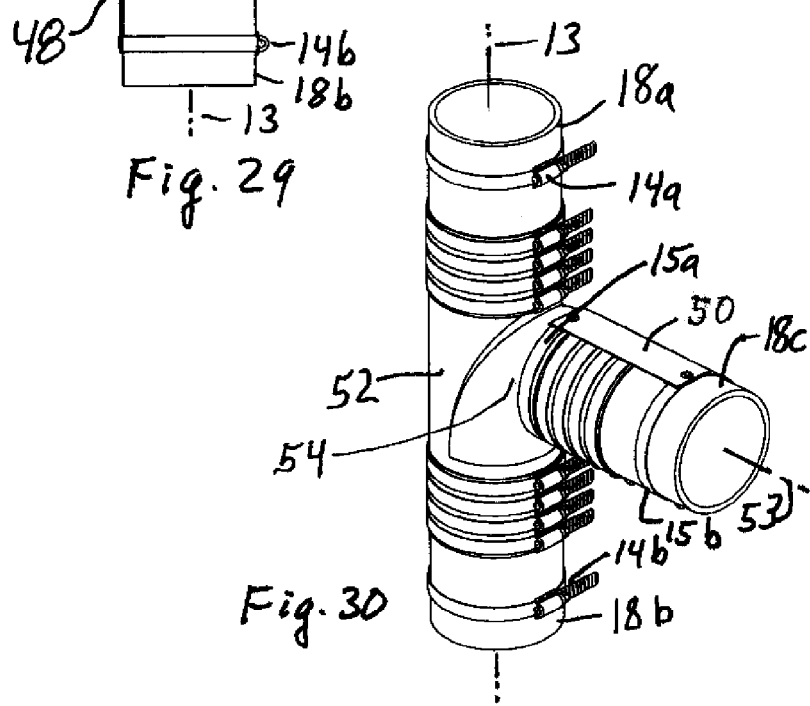
Fig. 30

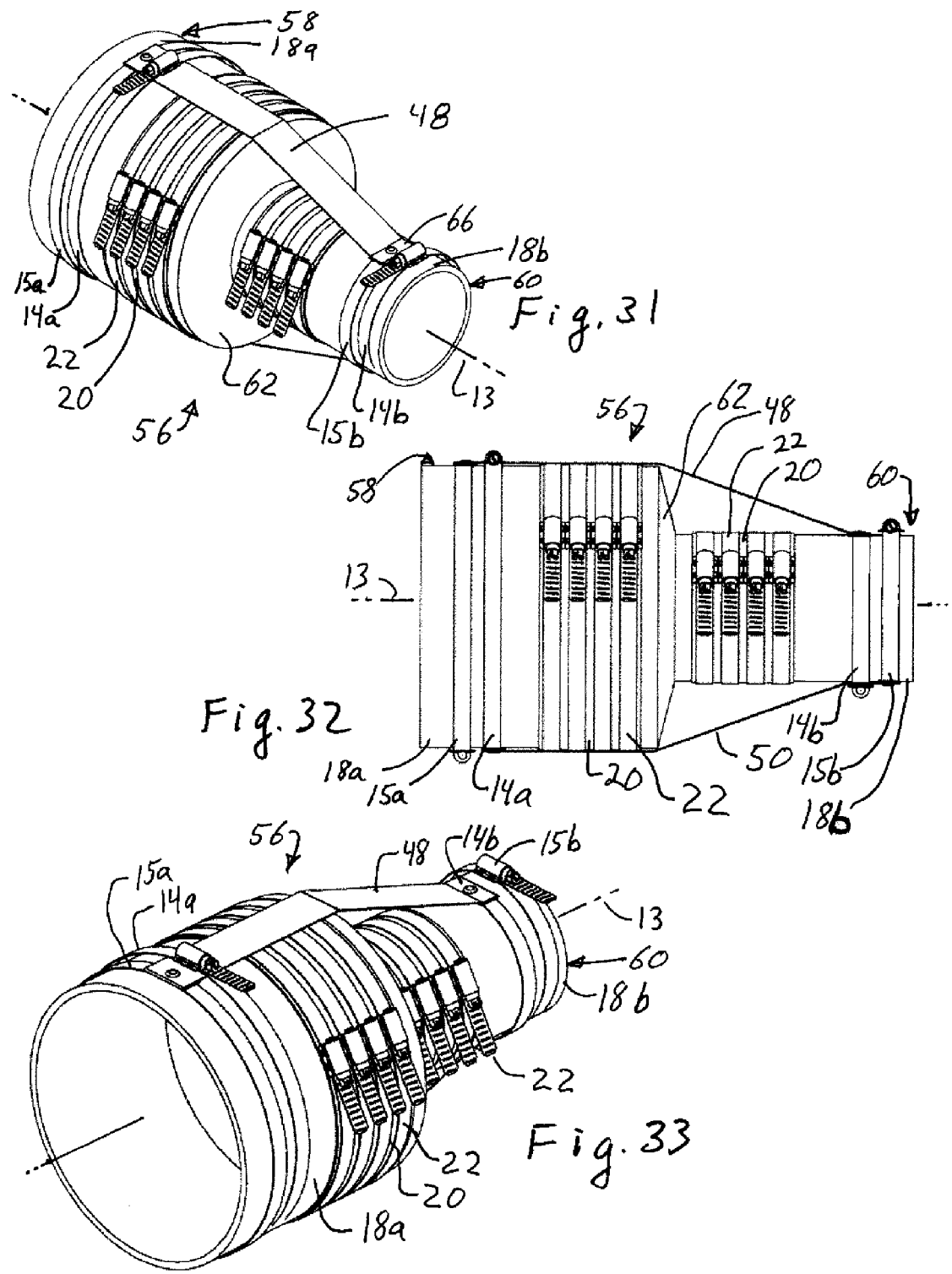

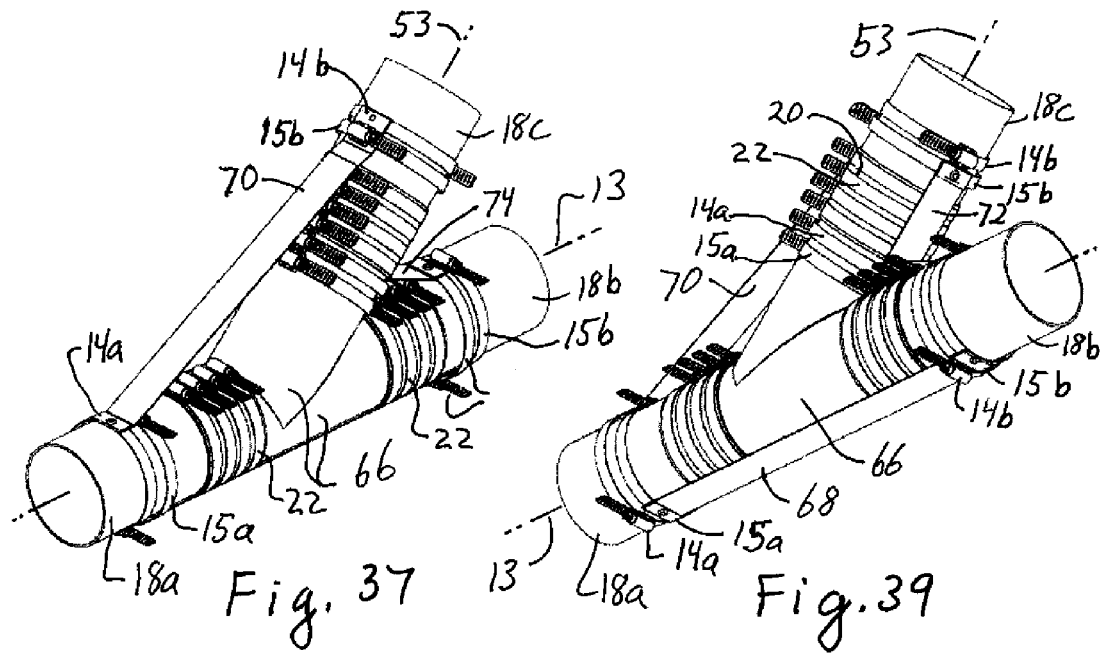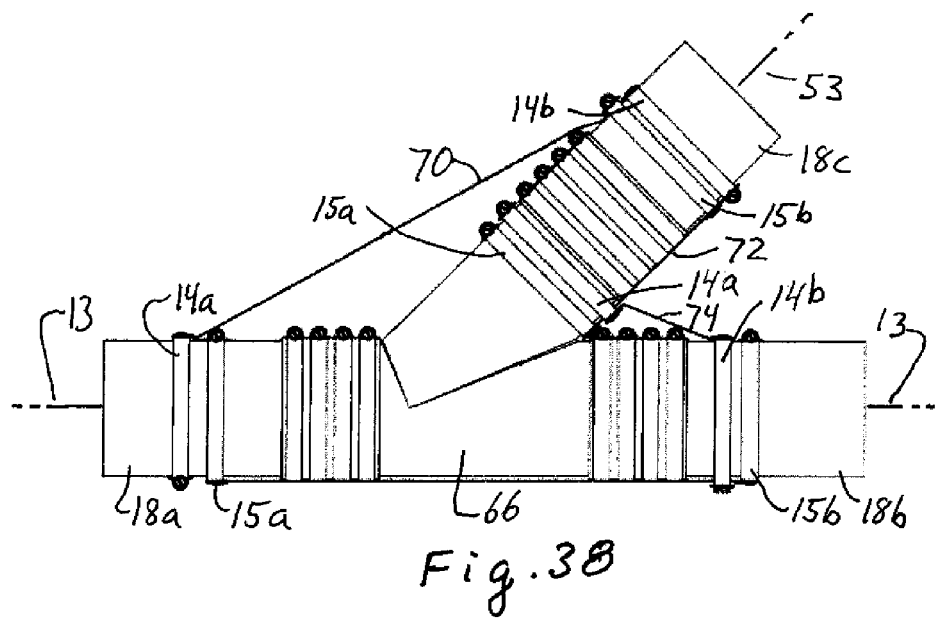

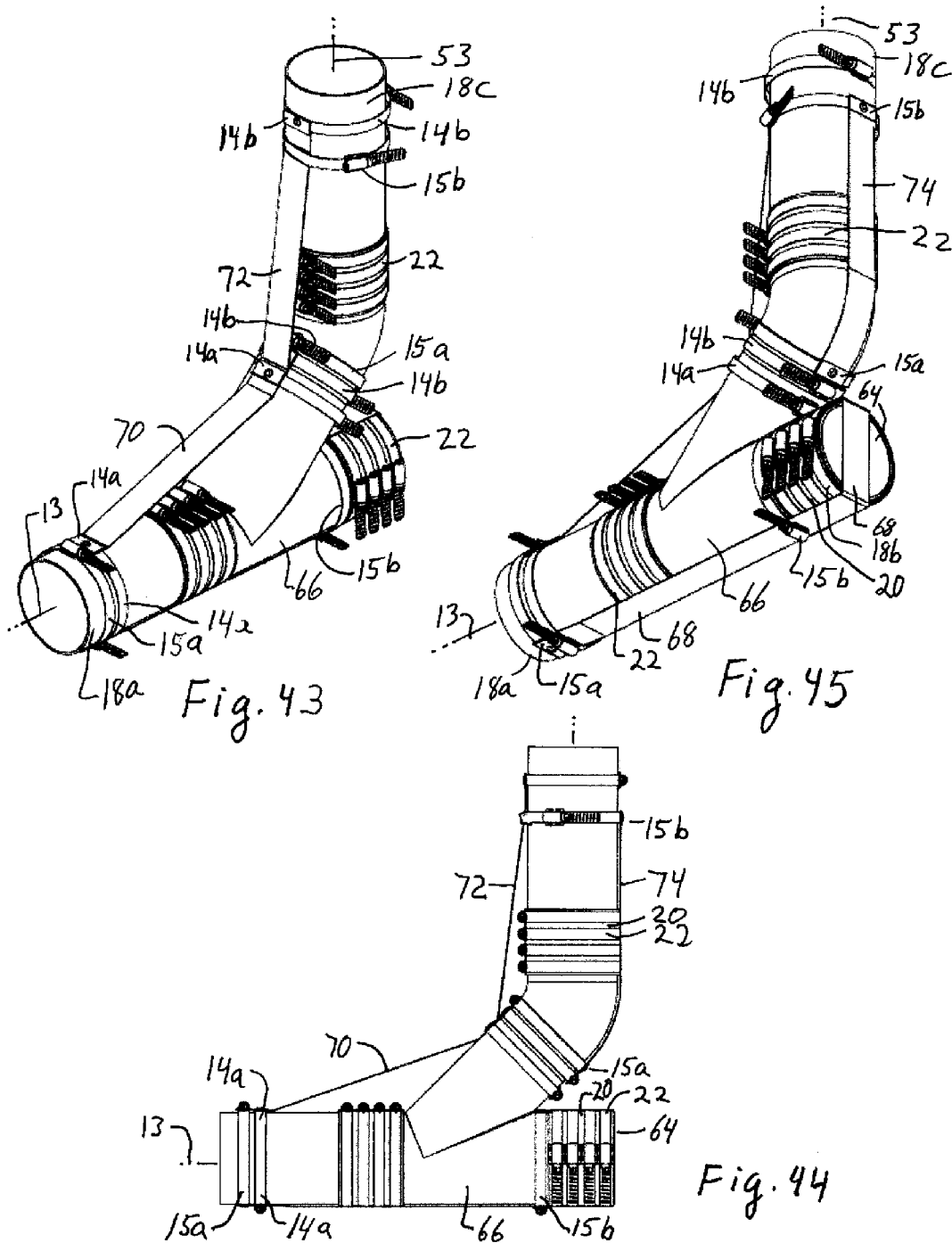

PIPE JOINT RESTRAINT

CROSS-REFERENCE TO RELATED APPLICATIONS

Application claims priority to Provisional Patent Application No. 61/163,398 filed Mar. 25, 2009, the complete contents of which are incorporated herein by reference.

BACKGROUND

This invention relates to a method and device that helps maintain the integrity of a pipe system when subjected to abnormal internal pressures. It is especially useful in drain pipe systems made of cast iron.

In a typical building drain piping system, sections of cast iron drain or DWV (drain, waste and vent) pipe and their fittings are assembled by butting the ends of the pipe sections together and bridging the joints with water-tight rubber or rubber/metal couplings. These abutting pipes and fittings are secured together and sealed with metal band screw clamps tightened to about 60 in-lb of torque to compress the tubular sleeves. This is commonly called a "no-hub" cast iron system.

Building drain or DWV piping is considered a low-pressure application typically operating at about 5 psi or less when in service, Such piping systems are not usually subject to the rigorous engineering of a pressurized pipe system.

However, under "high" pressures, e.g., above 15-20 psi, such as might occur within the piping system when drains become blocked in a multi-story building or under system pressure testing, these joints and fittings have a tendency to move and sometimes separate, with resulting leakage and property damage. The thrust forces involved in causing the separation can vary from a few hundred pounds to several thousand pounds, depending on the size of the pipe and number of floors behind the drain back-up.

At least in part because gravity (the weight of the pipe) does not effectively counter the separation forces where the pipe is running horizontally, such joint failures tend to occur at or near the point where the drain piping changes direction from vertical to horizontal, particularly as commonly occurs at the base of a multi-story vertical "stack" of pipe, such as at the building ground floor. Where the joints at such transitions are able to withstand the pressure and maintain integrity, however, the next and subsequent joints in the horizontal piping at which changes in direction occur may also be subject to the same type of failure.

There is no standard solution to this, and not every building contractor takes the pains to address it. A common method of dealing with the potential problem is to fabricate some kind of "splint" system on-site to reinforce major vertical-to-horizontal transitions in the piping, using bulky and often expensive combinations of threaded rod, fasteners, scrap or fabricated metal or heavy pipe "riser clamps" which are large, usually heavy-gage metal clamps which look like bear traps and which are commonly used to support the weight of vertical pipe runs by resting on the decks of consecutive building floors. There is thus a need for way to restrain movement in the joints adjacent to a bend in the drain/DVW piping, and to reduce the solution down to a simple, standardized, easily transported and installed device, which can be capable of working with a range of pipe sizes, pipe types, and pipe pressures.

BRIEF SUMMARY

A restraint strap has each end provided with a pipe connector. One pipe connector encircles and clamps against an underlying adjacent pipe section. The other pipe connector encircles and clamps against a different adjacent pipe section or to the pipe fitting. The strap length may be adjusted to tighten the straps and urge the clamped pipe section(s) toward the pipe fitting. The straps restrain the adjacent pipe sections from moving away from the pipe fitting during high pressure or high flow conditions. The straps restrain the adjacent pipe sections from splaying during high pressure or high flow conditions. The pipe connectors may encircle the tubular sealing sleeves that sealingly join the adjacent pipe sections to the pipe fitting. Preferably, two straps, each with pipe connectors are used to connect the adjacent pipe sections. The straps are preferably in the same plane to provide symmetric forces to the connected pipe sections and thus avoid tilting or canting relative to the connected parts. The centerline of the flow path is also in that same plane. Depending on the shape of the pipe fitting, different strap lengths are provided with the pipe connectors fastening to different adjacent pipe sections or different parts of the pipe fitting.

There is thus advantageously provided a pipe joint having a first flow path with a first centerline passing through a first adjacent pipe section, a pipe fitting and a second adjacent pipe section. The pipe fitting separates the adjacent pipe sections. Each adjacent pipe section is sealingly joined to the pipe fitting by tubular seals. The pipe restraint on this joint includes a first strap extending between the adjacent pipe sections. The first strap has opposing ends with each end connected to one of a first and second pipe connector. The pipe connectors are on the same side of the first strap. Each of the first and second pipe connectors encircles and clamps to a different one of the first and second adjacent pipe sections. The first strap has a length that extends in a first plane that also contains the first centerline;

The pipe joint has a second strap with a length also extending in that first plane. The second strap has opposing ends each connected to one of a third and fourth pipe connector. The third pipe connector is connected diametrically opposite the first strap to one of the first and second adjacent sections, and the fourth pipe connector is connected to either the other adjacent pipe section or to the pipe fitting.

In further variations, this pipe joint has the fourth pipe connector connected to the other adjacent pipe section. Preferably, but optionally, least one of the first and second straps further includes an adjustable length mechanism to tighten the at least one strap and urge the adjacent pipe section to which the adjustable length strap is connected toward the pipe fitting. The pipe fitting may be curved, with the second strap forming an outer strap extending along an outer periphery of the curved pipe fitting and with the fourth pipe connector connected to the other adjacent pipe section. The pipe joint may have a substantially straight centerline with the first and second straps substantially parallel along a substantial portion of the length of the first and second straps. The pipe fitting may be a reduction fitting having a centerline that is substantially straight and with the first and second straps substantially parallel for a portion of the length of the straps, but inclined toward each other for a portion of the length of the straps.

The pipe joint may have a pipe fitting with a second flow path passing through the fitting and a third adjacent pipe section. The second flow path has a second centerline merging with the first centerline through a portion of the pipe fitting. In this variation, the fourth pipe connector may connect to the third adjacent pipe section. In this variation, the pipe joint may include at least one additional strap having opposing ends each having one of fifth and sixth pipe connectors, with the fifth pipe connector fastened to the third adjacent pipe section and the sixth pipe connector fastened to the pipe fitting. In this variation, one of the adjacent pipe sections may include a blind end, with the fourth pipe connector connected adjacent an outlet of the pipe fitting leading to the blind end and the second strap crossing the blind end and the fourth pipe connector.

In further variations, the pipe joint may have each end of the pipe connectors comprising a clamp encircling the pipe, with at least one end of each strap having an adjustable fastener to vary the length and tightness of the strap to which the adjustable fastener is connected. Advantageously, but optionally, each end of the pipe connectors encircles one of the sleeves. Alternatively, or in addition, one or more of the pipe connectors may comprise a split ring clamp encircling the pipe, with at least one of the straps having an adjustable length fastener connecting the strap to the clamp in order to vary the tightness of that strap.

There is also provided a kit for maintaining the position of pipe sections that are joined to a pipe fitting having a first flow path with a first centerline passing through first and second adjacent pipe sections during use. The pipe fitting separates the adjacent pipe sections during use. The kit includes a first strap having opposing ends each of which is fastened to a first pipe connector extending from the same side of the first strap. Each first pipe connector is of sufficient size to encircle a different one of the adjacent pipe sections during use. The first strap has a length sufficient to extend at least between the adjacent pipe sections in a straight line during use. The kit also includes a second strap having opposing ends each of which is fastened to a second strap pipe connector that extends from the same side of the strap. Each second pipe connector is of sufficient size to encircle a different one of the adjacent pipe sections during use. The outer strap has a length sufficient to extend at least around an outer periphery of the pipe fitting and reach the adjacent pipe sections during use. Each of the first and second pipe fittings comprise adjustable diameter ring clamps.

In further variations, the kit may include a second strap includes an additional second pipe connector connected to the second strap and located between the ends of the second strap and extending from the same side of the strap as the other second pipe connectors. The additional pipe connector may be movably connected to the second strap so it can be moved along a length of the second strap. The kit may have each strap provided with an adjustable length mechanism or connector to vary the length of the strap. The kit may include at least one tubular sealing sleeve and clamps to seal the sleeve against one of the adjacent pipe sections or pipe fitting during use. The kit may further include the pipe fitting.

There is also provided a method of restraining movement of pipe sections sealingly joined to a pipe fitting by tubular seals where the pipe fitting has a first flow path with a first centerline through first and second adjacent pipe sections. The method includes: placing a first strap between the first and second adjacent pipe sections, with the first strap having a length with opposing ends each connected to one of a first and second pipe connector, on the same side of the first strap. The method includes connecting the first and second pipe connectors to a different one of the first and second adjacent pipe sections so the first strap extends in a first plane also containing the first centerline. The method further includes placing a second strap having a length with opposing ends with each end connected to one of a third and fourth pipe connector so the third end is adjacent the same adjacent pipe section as the first pipe connector. The method also connects the third pipe connector diametrically opposite the first strap to the same adjacent pipe section as the first pipe couples. The method also connects the fourth pipe connector to either the other adjacent pipe section or to the pipe fitting so that the length of the second strap lies in the first plane. Finally, the method also connects a first end of a second strap to one of the first and second adjacent sections, and connecting the fourth pipe connector to either the other adjacent pipe section or to the pipe fitting.

The method preferably includes connecting the fourth pipe connector to the other adjacent pipe section. Moreover, at least one of the first and second straps may include an adjustable length mechanism to tighten the at least one strap and urge the adjacent pipe section to which the adjustable length strap is connected toward the pipe fitting.

Additionally, the pipe fitting may be curved and the second strap may include an outer strap extending along an outer periphery of the curved pipe fitting, with the fourth pipe connector connected to the other adjacent pipe section. Moreover, the centerline may be substantially straight with the first and second straps substantially parallel along a substantial portion of the length of the first and second straps. The pipe fitting may comprise a reduction fitting with the centerline substantially straight and the first and second straps substantially parallel for a portion of the length of the straps, but inclined toward each other for a portion of the length of the straps. The pipe fitting may include a second flow path passing through the fitting and a third adjacent pipe section, the second flow path having a second centerline merging with the first centerline through a portion of the pipe fitting, in which case the method includes connecting the fourth pipe connector to the third adjacent pipe section.

At least one additional strap having opposing ends each having one of fifth and sixth pipe connectors may be provided, in which case the method includes connecting the fifth pipe connector to the third adjacent pipe section and the sixth pipe connector to the pipe fitting. The method may also include providing one of the adjacent pipe sections as a blind end, in which case the method includes connecting the fourth pipe connector adjacent an outlet of the pipe fitting leading to the blind end and placing the second strap so it crosses the blind end and the fourth pipe connector. The method may include providing each of the pipe connectors as a clamp encircling the pipe, with at least one end of each strap having an adjustable fastener to vary the length and tightness of the strap to which the adjustable fastener is connected.

The method may include providing pipe connectors with an adjustable diameter band clamp and further include the step of adjusting the tightness of at least one of the straps. The pipe connectors may comprise a split ring clamp encircling one of the adjacent pipes, with at least one of the straps having an adjustable length fastener connecting the strap to the clamp in order to vary the tightness of that strap. Moreover, sealing sleeves may be placed over the connections between the pipe fitting and the adjacent pipe sections, or integrated with the fitting, at least one of the pipe connectors being placed to encircle and compress one of the sleeves. The method may include adjusting the tightness of the inner and outer straps to increase the tension in each of the straps.

In much more detail, a joint restraint is provided for a curved pipe joint having a curved pipe section joining two adjacent pipe sections. The pipes are joined using tubular rubber or elastomeric sleeves held by various clamps, such as hose clamps, to form fluid tight seals. Preferably, at least two sleeve-type clamps are secured at the junctures of the curved pipe section and each adjacent pipe section. Two pipe connectors also encircle each proximal end of the adjacent pipe sections and if desired, may also sealingly join the curved pipe section to adjacent pipe sections. An inner strap extends between and fastens to one of the pipe connectors on each adjacent pipe section forming a chord of an arc. An outer strap extends along an outer periphery of the joined pipes and fastens to the other pipe connector on each adjacent pipe section. Each of the two pipe connectors attached to each strap is located on a different one of the adjacent pipe sections. The straps have a length extending in a plane through a center of the flow path of the joined pipes. The straps are on diametrically opposing sides of the sleeves and pipes. The pipe connectors are positioned to provide straps that are tight enough so that the inner strap restrains or impedes outward splaying of the curved pipe section and adjacent pipe sections joined thereto. The pipe connectors are positioned to provide straps that are tight enough so that the outer strap restrains or impedes movement of the adjacent pipe sections toward each other, or tilting of the adjacent pipe sections, or movement of the adjacent pipe sections away from the curved pipe section. Advantageously, the clamps are hose clamps or pipe clamps.

In a further embodiment, a restrained pipe joint is provided where the pipe joint has a flow path therethrough. The restrained pipe joint has a curved pipe section having opposing first and second ends. An inner curved periphery is located in a plane containing a center of the flow path and an outer curved periphery in the same plane. First and second adjacent pipe sections each have a proximal end adjacent the curved pipe section. First and second tubular sleeves are provided along with a plurality of clamps to join the adjacent pipe sections to the curved pipe section. Each sleeve has a proximal end adjacent the curved section and has an opposing distal end with at least one of the clamps sealingly connecting the proximal end of the sleeve to a different end of the curved pipe section. Each distal end of the sleeves is further connected to a proximal end of a different adjacent pipe section, with at least one of the clamps sealingly connecting the distal end of the sleeve to the proximal end of the adjacent pipe section. An inner strap is provided that has opposing ends each connected to the distal end of each pipe on an adjacent pipe section, preferably through a pipe connector that encircles one of the adjacent pipe sections or possible encircles part of the pipe fitting to which the pipe sections are joined. The inner strap restrains the distal ends of the sleeves and associated adjacent pipe sections from splaying. An outer strap extends around an outer periphery of the curved pipe section and has opposing ends each connected to the distal end of each adjacent pipe on an outer side of each adjacent pipe through a pipe connector. The outer strap restrains the distal ends of the sleeves and associated adjacent pipe sections from moving toward each other, and may restrain the associated adjacent pipe sections from moving away from the curved pipe section either alone, or in conjunction with the inner strap. The pipe connector to which the inner and outer straps connect preferably connects directly to the adjacent pipe sections by encircling those pipe sections and clamping to them, but the tubular sleeves could be interposed between those pipe connectors and the pipe sections.

Preferably, each end of the straps connects to one of the pipe connectors adjacent to a distal end of the sleeve on that pipe section. Optionally, each end of the straps connects to a different one of the pipe connectors with the connectors encircling a distal end of the sleeve to further seal against leakage. Each end of the outer strap is preferably connected to the pipe connectors that are closer to the curved pipe section.

In the above and other pipe joint and variations, the inner strap is preferably substantially straight and tight, and extends across a space between adjacent pipe sections or pipe fittings. In the above and other pipe joint and variations, the outer strap closely follows the contour of the pipe joint and typically abuts the outer surface of the pipe and sealing sleeves and associated sealing clamps. Moreover, the inner and outer straps connect to the pipe connectors at locations that are on opposite sides of the pipe sections and fittings, with the straps preferably having lengths which lie in a common plane, and more preferably which lie in a plane containing the flow path through the pipe joint. Further, the outer strap can be advantageously fastened to an outer periphery of the curved pipe section to ensure the strap remains in the preferred plane.

Further variations are provided which use T fittings and Y fittings, each having various adjacent pipe sections or additional pipe fittings connected by sealing tubes and clamps. In each variation, a strap extends across the joint to fasten the adjacent pipe section or pipe fitting to the main fitting or to an adjacent pipe section in order to restrain relative movement or tilting of the joined parts. Those straps or are held to the respective parts by pipe connectors that preferably clamp the ends of the straps to the respectively joined and restrained parts by an adjustable tightening mechanism. Preferably, the length of the straps can be changed to tighten the straps and urge the joined parts of the pipe joint toward each other. Ideally, the straps are symmetrically placed on diametrically opposing sides of the pipe sections and joints to reduce tilting or canting of the joined parts.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a perspective view showing the inner side of a pipe joint of this invention;

FIG. 2 is a side perspective view of the pipe joint of FIG. 1;

FIG. 3 is a back perspective view of the pipe joint of FIG. 1, showing the outer periphery of the joint;

FIG. 4 is a side plan view of the pipe joint of FIG. 1;

FIG. 5 is a right side plan view of the pipe joint of FIG. 4;

FIG. 6 is a left side plan view of the pipe joint of FIG. 4;

FIG. 7 is a top plan view of the pipe joint of FIG. 4;

FIG. 8 is a bottom plan view of the pipe joint of FIG. 4;

FIG. 9 is an enlarged plan view taken along circular section 9-9 of FIG. 4;

FIG. 16 is a perspective view showing the inner side of a larger diameter pipe joint of this invention;

FIG. 17 is a perspective view of the pipe joint of FIG. 16 without the pipes and sealing sleeves;

FIG. 19 is a lower perspective view of a 90 degree pipe joint with inner and outer straps;

FIG. 20 is a sectional view taken along flow path centerline 13-13 of FIG. 19

FIG. 28 is a back side perspective view of a T-joint using the straps and pipe connectors of this invention;

FIG. 29 is a side plan view of the T-joint of FIG. 28;

FIG. 30 is a front side perspective view of the T-joint of FIG. 28;

FIG. 31 is a front side perspective view of a reducing joint using the straps and pipe connectors of this invention;

FIG. 32 is a side plan view of the reducing joint of FIG. 31;

FIG. 33 is a back side perspective view of the reducing joint of FIG. 32;

FIG. 37 is an upper, front perspective view of a pipe joint having a Y or wye connector with a straight pipe section on each branch of the wye, and a straight pipe section on the leg or base of the wye;

FIG. 38 is a side plan view of the pipe joint of FIG. 37;

FIG. 39 is a lower, back perspective view of the pipe joint of FIG. 37;

FIG. 43 is a front perspective view of a pipe joint having a Y or wye connector with a blind end plug on one branch of the wye, a curved pipe section joining a straight pipe section on the other branch of the wye, and a straight pipe section on the leg or base of the wye;

FIG. 44 is a side plan view of the pipe joint of FIG. 43;

FIG. 45 is a lower back perspective view of the pipe joint of FIG. 43;

DETAILED DESCRIPTION

Figure 10:
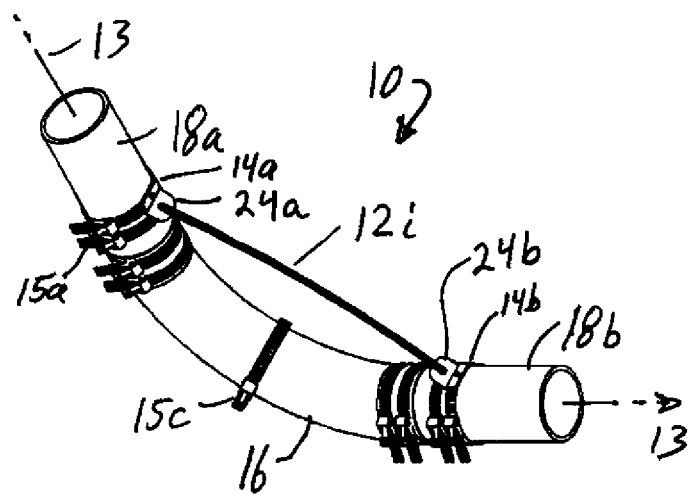
FIG. 10 is a perspective view of the pipe joint of FIG. 1 with a variation in straps.

Referring to FIGS. 1-9 and 11-12, a pipe restraint 10 is shown having elongated inner and outer straps 12*i* and 12*o*, respectively. Pipe connector 14*a*, 14*b* are fastened to opposing ends of inner strap 12*i*, and pipe connectors 15*a*, 15*b* are fastened at opposing ends of the outer strap 12*o*. An additional pipe connector 15*c* can be fastened to the outer strap 12*o* intermediate the ends of the strap as shown in FIG. 1. The pipe restraint 10 helps prevent a pipe joint from coming apart under high fluid flows through the pipe along flow path 13 through the pipe, or under high internal pressures in the pipe.

A typical pipe joint includes a curved pipe section 16, such as an elbow section having a 45° or a 90° curve, with opposing ends 17*a*, 17*b* (FIG. 20). The typical joint further has a first upstream pipe section 18*a* and a second downstream pipe section 18*b* on opposing ends of curved pipe section 16. Each pipe section 18*a*, 18*b* has a first upstream end 19*a* and a second downstream end 19*b*, with one of the ends sized to abut or be sealingly connected to the abutting or adjacent end 17*a*, 17*b* of curved section 16. Thus, second downstream end 19*b* of upstream pipe section 16*a* abuts first upstream end 17*a* of curved section 16, while the downstream pipe section 16*b* has its first upstream end 19*a* abutting the second downstream end 17*b* of the curved pipe section 16. The pipe sections 18*a*, 18*b* are sometimes referred to herein as abutting pipe sections because they have one end abutting or connected to curved pipe section 16, but the sections 18*a*, 18*b* do not abut or connect directly each other. Further, while the ends are referred to as abutting ends, the ends may be connected in a non-abutting manner unless expressly described or defined as abutting.

The ends of pipes 16, 18 are of the same general size and shape and typically abut against each other or are joined to maintain the ends very close to each other. The pipes are typically made of cast iron, but could be made of other materials, including, but not limited to, plastic, clay, porcelain or steel. The pipes 16, 18 are typically circular in cross section.

Tubular sealing sleeves 20 are placed over the joints of the pipe ends. The sleeves 20 are typically made of rubber or are made of metal with an inner liner made of an elastomeric or other sealing material, or of combinations of metal and rubber. The tubular sealing sleeves 20 extend over an adjacent end of each abutting pipe with clamps 22 clamped around a circumference of each such pipe to prevent fluid from leaking out between the sleeve 20 and the joint pipes 16, 18. Typically, clamps 22 are hose clamps or ring clamps that encircle and compress the sleeve 20 against the pipe underneath the clamp 22. At least one, but often two or more clamps 22 are used to clamp a sleeve to each of the pipes 16, 18 to help prevent or at least minimize leakage and to strengthen the connection.

Sometimes, the ends of the pipes 16, 18 may have a raised boss around the distal ends of the pipe with the clamp 22 being located right by this raised boss to deform the sealing sleeve 20 inward against the outer surface of the pipe 16, 18 which is slightly smaller in diameter than the boss and thus form a better seal as the sleeve is stretched or deformed over the larger boss. Alternatively, grooves may be formed in the ends of the joined pipes and the sealing sleeves 20 formed with mating grooves. Such sleeves and pipes are found in U.S. Pat. No. 3,851,901, the complete contents of which are incorporated herein by reference.

The pipe restraint 10 preferably fastens directly to pipe segments 18 to hold the three joined pipe sections together under high pressure and/or flow conditions, the fastening location being adjacent or in proximity to the sleeves 20, but not on the sleeves 20. Less preferably, the pipe restraint 10 has part of tubular sealing sleeves 20 interposed between the connectors 14, 15 so the pipe connectors compress the sleeve and assist sealing. The straps 12 thus preferably fasten to the proximal end of each pipe section 18a, 18b which ends abut or are fastened to the curved section 16 to urge those pipe sections 18 toward the curved section 16 and hold them in place. FIGS. 1-5 show the pipe restraint 10 fastened to the proximal end of pipe section 18, with the abutting pipe ends concealed from view by the sleeve 20a, 20b. Advantageously, the pipe connectors 14 may directly grip the pipe segment 18.

As seen in FIGS. 1-9, two different straps 12 are usually used, an inner strap 12i and an outer strap 12o, each of which preferably allows installation independent of the sleeve 20 and clamps 22. The curved pipe segment 16 has an inner side with a smaller radius of curvature and a smaller distance between distal ends of the pipe in a plane containing the center of the flow path 13 through the pipe 16, and an outer side with a larger radius of curvature and longer distance between distal ends in that plane which contains the center of the flow path 13 through pipe 16. An inner strap 12i extends between the inner ends of the curved pipe section 16, preferably in the plane extending through the center of the flow path 13 through middle of the pipe 16. The inner strap 12i is generally straight and taut between the pipe connectors 14a, 14b. The outer strap 12o extends around the outer surface of the curved pipe 16 and part of the abutting pipe sections 18a, 18b, also preferably in the plane containing the center of the flow path 13. The straps 12i and 12o are thus preferably substantially in the same plane. The opposing ends of straps 12i and 12o are fastened to the pipes in that same plane, and thus fasten to the pipes 18a, 18b at generally diametrically opposing locations on the pipe 16, 18 and sleeves 20. The inner and outer straps 12i, 12o are located in a plane containing a centerline of a flow path 13 that extends through the curved pipe segment, with the outer strap preferably being substantially parallel to the centerline of that flow path 13 through the pipe joint. Since the flow path 13 passes through curved pipe section 16 and straight pipe sections 18, the flow path does not have a constant curvature.

Each sleeve 20 is fastened to one end of the curved section 16 and one end of the first adjacent or abutting section 18a or 18b. The downstream end 16b is used for illustration with the upstream end 16a having a similar connection. A first and second clamp 22a, 22b encircle and tighten sealing sleeve 20b against the downstream end 17b of curved section 16. A single clamp 22 could be used, but two clamps 22 add stability to the sleeve to resist movement and tilting of sleeve 20 relative to curved pipe section 16, and also provide a better fluid seal. A second set of clamps 22 would normally seal the other (downstream) end of sleeve 20 against the adjoining or abutting pipe section 18b. Preferably, adjacent to the end of the sleeves 20 are the pipe connectors 14, 15. In less preferred variations of the pipe restraint 10, the clamps 22 on the pipe section 18 that compress the sleeve 20 may be fastened to straps 12i, 12o (or vice versa) to form pipe connectors 14, 15.

Advantageously, the inner strap 12i with its connector 14b is further from the center of curved pipe section 16 downstream than the outer strap 12o and its connector 15b. Both connectors 14b, 15b encircle and against the adjacent pipe section. Further, the connectors 14b, 15b are preferably positioned to ensure the inner strap 12i is taut and in slight tension, and that the outer strap, 12o is also taut and in slight tension, with the straps 12i, 12o preferably exerting the same force on their respective pipe connectors 14, 15. In FIGS. 1-3, the pipe connectors 15 of the outer strap fasten closer to the curved pipe 16 than do the connectors 14 of the inner strap 12i. But the locations could be reversed with the inner strap 12i and its pipe connectors 14 being located closer to the ends of the curved pipe 16 than are the connectors 15 to which the outer strap 12o is fastened.

Described slightly differently, each sleeve 20 has a proximal end adjacent to and sealingly connected to a different end 17a, 17b (FIG. 20) of the curved section 16. Each sleeve 20 has a distal end opposite the proximal end, and each distal end is sealingly connected to a different one of the adjacent pipe sections 18. One and preferably two clamps 22 connect the proximal end of each sleeve 20 to an end 17a, 17b of the pipe section 16. One, and preferably two clamps 22 connect the distal end of each sleeve to one end on one of the adjacent pipe sections 18a, 18b. The pipe connectors 14, 15 may encircle and clamp to the adjacent pipe sections adjacent the sleeve 20. Less preferably, one or both clamps 22 connecting each sleeve 20 to an adjacent pipe section 18a or 18b may each be connected to one strap 12i or 12o to form pipe connector 14 or 15. Even less preferably, one clamp 22 may be connected to both straps 12i and 12o to form a common pipe connector (combining 14 and 15).

Increased pressure in the pipe section formed by joined pipe segments 18a, 16, 18b will tend to splay the segments and open-up the curve formed by those joined segments. In other words, under high pressure or flow rates the distal ends 19a and 19b of segments 18a, 18b, respectively, tend to move away from each other, and also move away from the abutting end of curved pipe segment 16 along the flow path 13. When one or both of the abutting pipes 18a, 18b are urged away from the adjacent end of curved pipe section 16, the inner strap 12i is placed in tension and tries to bow the curved section of pipes 18a, 16, 18b inward, moving the joined ends of pipe sections 18a, 18b toward each other. The outer strap 12o also opposes this motion of pipe sections 18a, 18b along flow path 13 such that the outer strap 12o is pulled against portions of pipe sections 18a, 18b, 16 and sleeves 20a, 20b which abut or connect to the strap 12o. The strength of the pipe segments 16, 18 themselves are thus used to restrain movement and to maintain joint integrity and reduce leakage of the joints with curved segment 16. Because the straps 12i, 12o are generally in the same plane and on opposing sides of the pipe segments 18, the straps do not tilt the pipe segments 18. Tilting of pipe segments 18a, 18b relative to curved section 16 will cause the joint to leak and allow pressure to enlarge the leak and separate the joined pipes.

If pressure along flow path 13 pushes the first pipe sections 18a, 18b away from the curved pipe 16, the straps 12i and 12b pull on opposing sides of the sleeves 20 and pipes 18 to prevent movement along the flow path 13, and to prevent tilting in the plane containing the center of the flow path 13. If pressure along flow path 13 causes the curved pipe section 16 to straighten and assume a larger radius of curvature, that will cause the joint with first pipe sections 18 to tilt or open in the plane through the center of the flow path 13. The inner and outer straps 12i, 12o restrain that tilting of the pipe sections 18a, 18b. The straps 12i and 12o thus help restrain movement of the pipes 18 relative to the curved pipe section 16, and provide means for restraining motion of the pipes 18, especially for restraining motion in the plane through the straps 12i, 12o and through the center of the flow path 13. If the connectors 14, 15 encircle and clamp to the pipes 18a, 18b through the sleeves 20, then the connectors 14, 15 also help limit movement of the sleeves.

The strap 12o is thus positioned along on the greatest length of the curved pipe section 16, and the inner strap 12i extends along the longest chord between opposing ends of the curve formed by curved pipe 16 and its abutting pipes 18a, 18b. The pipe connectors 14, 15 are preferably adjusted to achieve and maintain this location. Thus, the outer strap 12o has a third pipe connector 14c which preferably fastens at or about the middle of the curved pipe section 16 to fasten the center of the strap 12o to the pipe 16 and to prevent it from slipping sideways around the pipe 16 and toward the inner side of that pipe. Pipe connector 14c is advantageously movably connected, and preferably slidably connected to strap 12o such that the connector 14c is moved or slid along the length of strap 12o to the most suitable position of strap 12o relative to the particular shape of the curved section 16. In some instances it may be advantageous to have the connection with the adjacent pipes 18a, 18b further from the curved section 16 and more toward the middle of the adjacent pipe(s) 18.

The outer strap 12o thus wraps in an arc around the outer-most contour of the pipe bend 16 and a portion of adjacent pipes 18. The outer strap 12o is preferably secured to the curved pipe segment 16 and to each of the two abutting pipe segments 18 just after the sealing sleeves 18, and alternatively on part of the sleeves by having the pipe connectors 15 clamp onto the sleeve(s) 20. The outer strap 12o acts as a passive tensile restraint against axial movement in the joint and against movement of the pipe segments 18 along flow path 13. For lower pressure applications, use of the outer strap 12o by itself may be sufficient and inner strap 12i may be omitted. As described later, the outer strap 12o may be placed in tension to form an active restraint by urging the adjacent pipe sections 18 toward the curved section 16.

For applications with higher potential pressures (e.g., taller buildings or larger pipes), the outer strap 12o may be supplemented by the inner strap 12i which preferably has its own two clamping or other securing means such as the connector 14. The inner strap 12i is tensioned diagonally across the bend formed by segments 18a, 16 and 18b to form a chord of the arch formed by those pipe sections. The inner strap 12i is clamped or otherwise secured to the two adjacent pipe sections 18a, 18b. This inner strap 12i counters the tendency of the two adjacent pipe sections 18a, 18b of the joint to splay outward and separate under higher pressures.

The inner strap 12i thus provides a tension member connected to opposing portions of pipes abutting a curved segment of pipeline on the inside of those abutting pipe segments and preferably in the plane through the centerline of the flow path through that curved pipeline segment and immediately adjoining segments to restrain that curved pipeline assembly from splaying outward to spread the ends of that assembly further apart. The outer strap 12o provides a tension member connected to opposing portions of the pipe segments abutting the curved segment of pipeline and located on the outside of those abutting pipeline segments and preferably in the plane through the centerline of the flow path through that curved pipeline segment assembly in order to restrain those abutting segments or portions thereof from moving inward toward each other and to provide a symmetric restraint opposite the location of the inner strap 12i to reduce and preferably prevent the pipes adjoining the curved pipe segment from tilting or canting relative to the initial flow path 13.

The inner and outer straps 12i, 12o pull the end segments 18a, 18b against the curved section 16, placing the assembly in compression. That compression helps prevent the end segments 18 from being pushed away from the curved section 16 by the flow of water or by water pressure. The positioning of straps 12i, 12o helps maintain the shape of the pipe assembly under high pressure.

The strap dimensions are sized to maintain the joint integrity to prevent fluid flowing in the pipes from leaking out of the joints. For pipes under six inches in diameter, the strap 12 comprises an elongated member that is preferably, but optionally, flexible, such as a strip of metal strap. The flexibility is only in one of three planes in that the strap can bent about its length to coil into a roll of strap, but is preferably not flexible along its length and not flexible laterally in the width of the strap. Thus, in the plane of the strap material, the strap is stiff and not flexible, but out of the plane of the strap the strap can flex and coil into a role or to conform to the shape of the pipe joint. The strap is preferably a tension member that does not bend sideways or extend its length but it can curve about its length to conform to the contour of a pipe joint.

The strap is advantageously less than two inches wide, and preferably about one to 1.5 inches wide for a strap made of stainless steel. The strap thickness is advantageously less than about 1/16 inch thick, and preferably about 0.03 inches thick when the strap is made of stainless steel. Depending on the size of the pipe or the pressure of the fluid in the pipe, the strap dimensions will vary. The straps 12i, 12o are preferably metal straps, but could be multiple thin straps fastened together by rivets or banding. Straps 12 made of round or flat metal or non-metal cable, other suitably strong and durable material, such as high-tensile polymer webbing or cord could also be used, but such straps may be flexible sideways in the plane of the strap and that is less desirable since such flexibility may allow the strap to slide sideways and move out of the plane passing through the centerline 13 and the strap on the other side of the adjacent pipe section 18 or the fitting and thus result in non-symmetric resistance of movement on the pipe sections in the pipe joint. The straps 12 are shown as flat across the width of the strap and curved along the length of the strap, but the straps 12 could be slightly curved across the width to better conform to the diameter of the pipes 16, 18. Ideally, the straps 12 are curved across the width of the strap with a radius of curvature corresponding to the outer diameter of the pipes 16, 18, and more particularly corresponding to the radial distance from center axis of flow path 13 to the outer surface of pipes 16, 18. Since one pipe restraint 10 may be used with a range of pipe diameters, the curvature may generally correspond to the diameter of pipes within that range.

Figure 11:
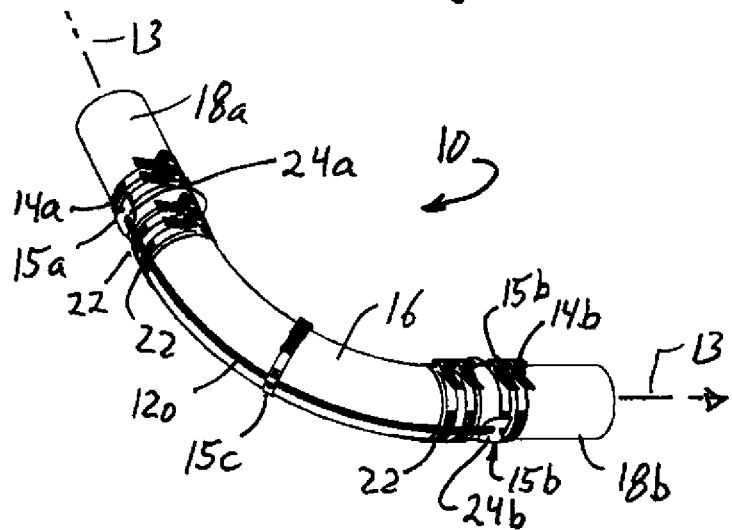
FIG. 11 is a perspective view of the pipe joint of FIG. 10 showing the outer periphery and outer strap.
Figure 13:
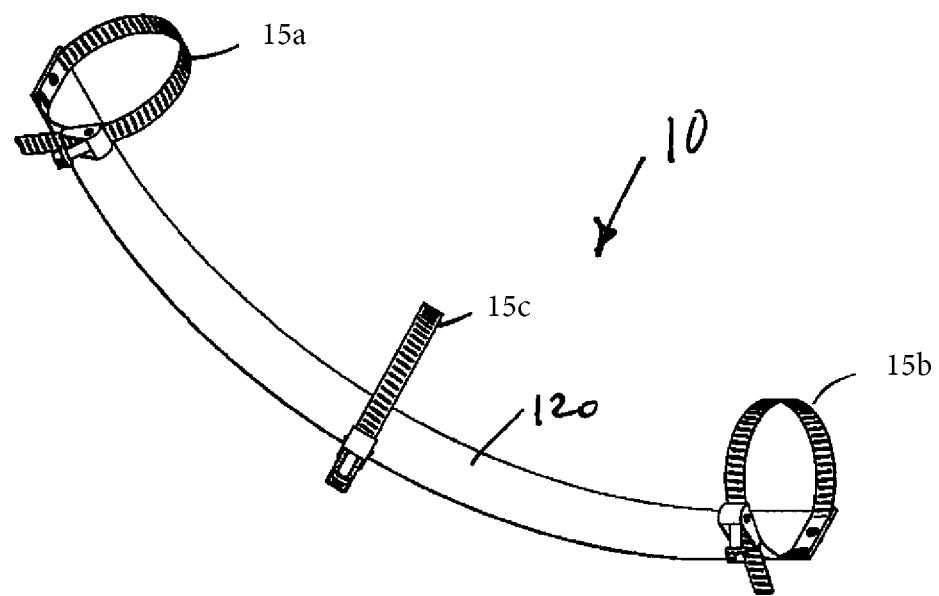
FIG. 13 is a perspective view of the straps shown in FIG. 2 without the pipe joint.
Figure 12:
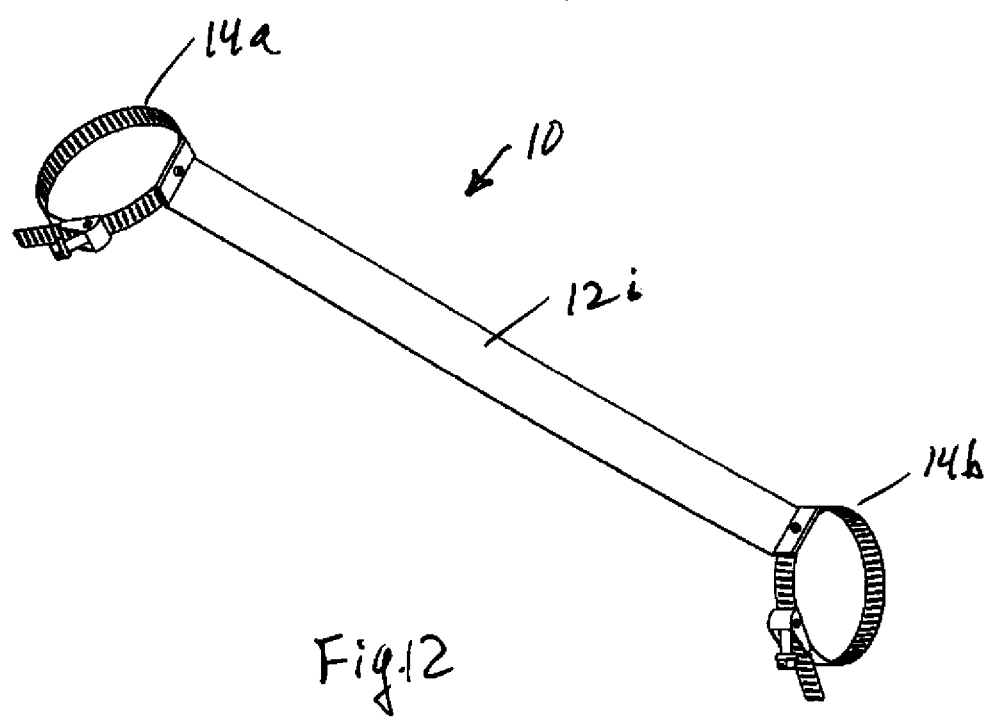
FIG. 12 is a perspective view of the straps shown in FIG. 1 without the pipe joint.
Figure 14:
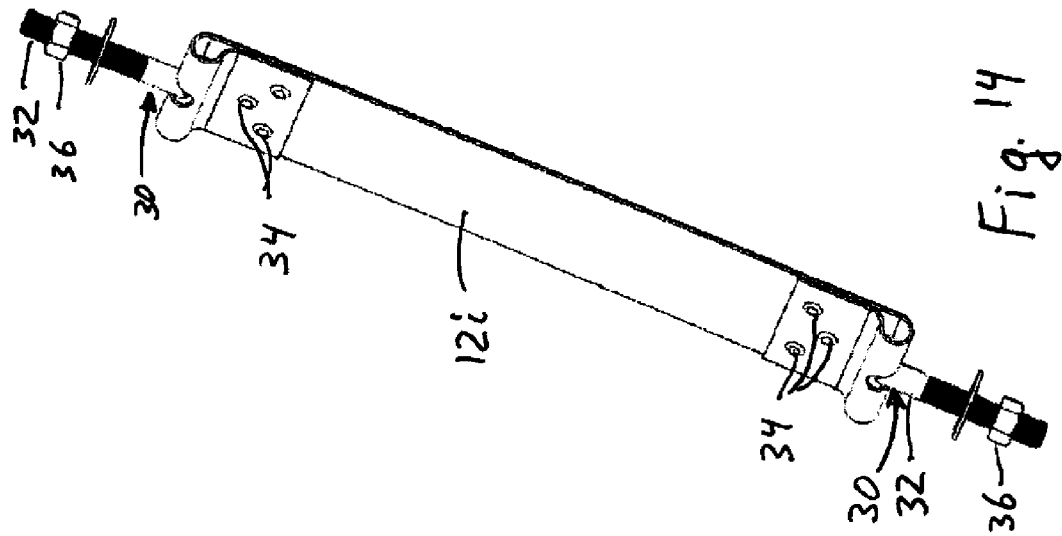
FIG. 14 is a perspective view of an inner strap with an adjustable length or adjustable force connection on each end of the strap.
Figure 15:
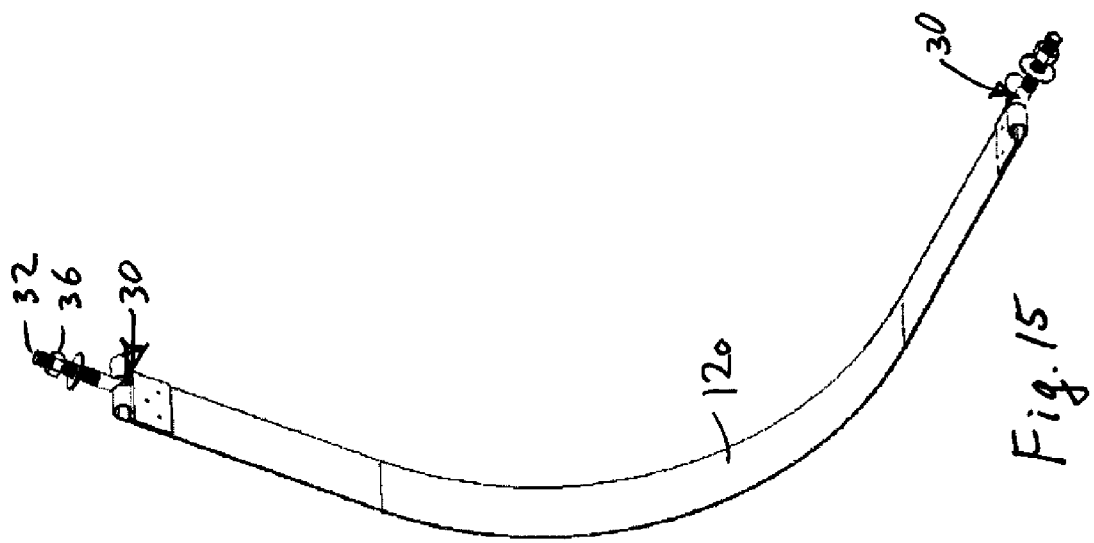
FIG. 15 is a perspective view of an outer strap with an adjustable length or adjustable force connection on each end of the strap.
Figure 18:
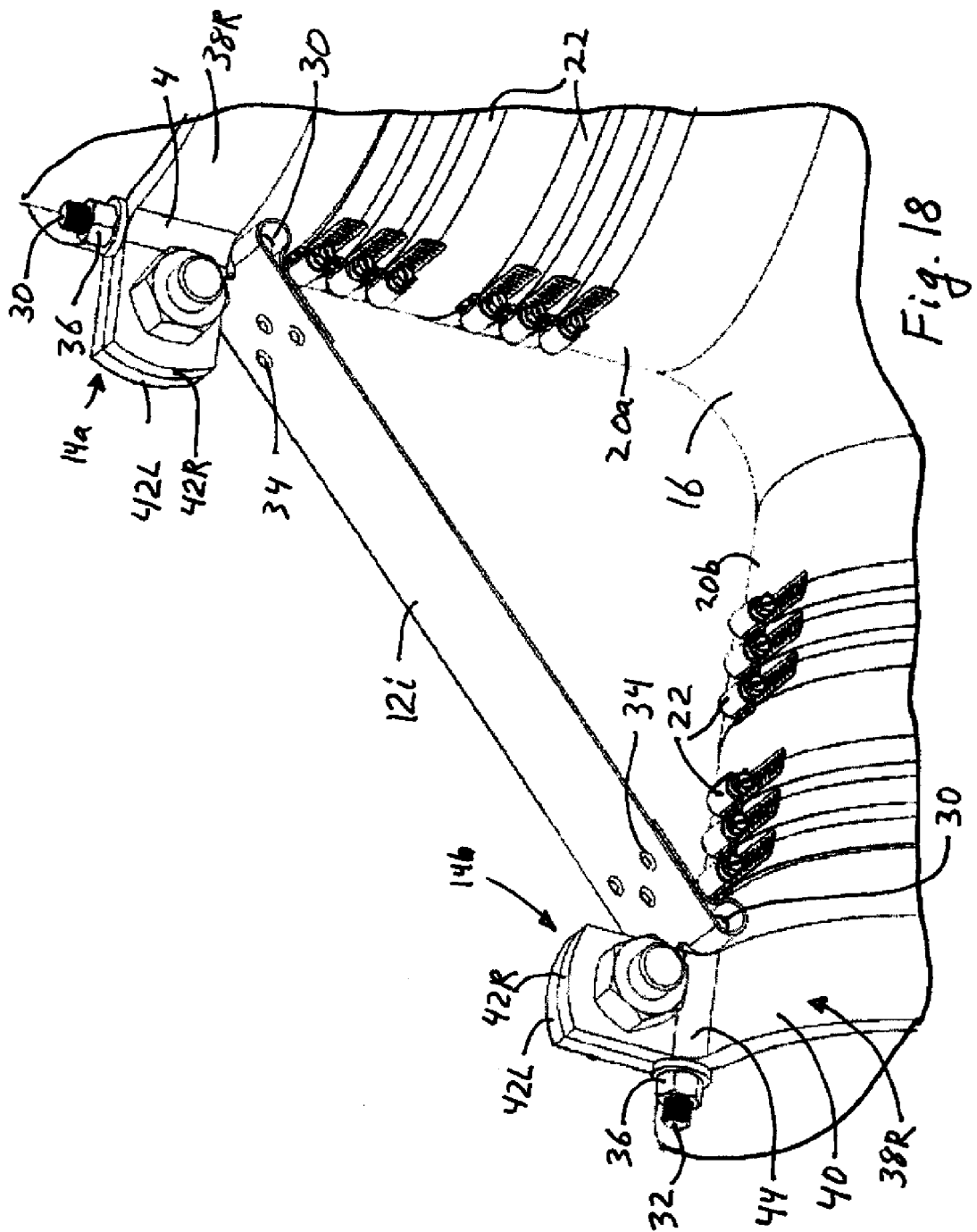
FIG. 18 is an enlarged perspective view of a portion of FIG. 16 showing the connection between the inner strap and pipe connectors.

FIGS. 1-9 show the straps 12 flat and wide. But the cross-sectional shape is not so limited and any shape could be used. The straps 12 are preferably primarily tension members, since the length between adjacent pipe sections 18 is such that the typical straps 12 will buckle if placed in compression rather than tension. FIGS. 10-11 show straps 12 with different cross sectional shape.

The connectors 14 and 15 may require adaptation according to the type of pipes 16, 18, especially if something other than a straight pipe section is used for the first abutting pipe section 18. One or more of the first pipes 18a, 18b could be a T-fitting, and end fitting, a Y-fitting, etc., and depending on the configuration of that first pipe section 18, it may be more suitable to use bands, ties, lugs, wire loops, adhesives or threaded fasteners, in either metal or non-metallic materials, to connect the straps 12 to the pipe segments 16, 18.

The type of pipe connectors 14, 15 that are used is not believed critical as long as the strap 12 can fasten to it to restrain movement of the sleeve 20 and/or pipe segment 18 along flow path axis 13. Hose clamps with opposing free ends joined by a tightening mechanism, with the straps 12 connected to the strap between those ends, are preferred. The pipe connectors 14, 15 are typically connected to the straps 12 between the ends, and preferably near the middle of the circumference of the pipe connector. The straps 12 are typically connected by rivets, spot welding, bolts, or other fastening mechanisms. The pipe connectors 14, 15 are preferably of adjustable length or adjustable diameter so the connectors 14, 15 can clamp or compress against the adjacent pipe section 16, 18. Thus, the straps 12 connect to the pipe connectors 14, 15 roughly opposite the adjustable tightening mechanism that holds opposing ends of the connectors 14, 15 and tightens the connectors 14, 15.

Hose clamps having a worm or screw device on a band clamp are useful for providing variable control over the tightening of the pipe connectors 14, 15, while toggle type clamps provide faster attachment and tightening but coarser adjustment on the tightening. A hose clamp with a threaded fastener adjustment or worm drive tightening, on a rotating or toggle type of connector has the advantage of quick installation with variable tightening adjustment. Such a fastener is sold commercially as the Snaplock Quick Release, worm drive clamps. The worm drive is pivotally attached to the band, with an arc of motion relative to the attachment point, such that at one extreme of the arc the screw threads fully engage the apertures in the band, and in the opposite extreme of the arc the screw threads and the apertures are completely disengaged. In this manner, the band may be quickly inserted and advanced through the passage while the screw device is pivoted away, then captured and tightened to the desired extent by pivoting the screw device back into engagement with the apertures and rotating the screw thread, e.g., with a hand tool. With the described pivot adaptation, the band clamp may therefore be installed quickly and efficiently around pipes or other objects of widely-varying sizes. But as noted above, other clamps are suitable.

Band clamps of various types are believed especially suited for use as the clamps 22 and as the pipe connectors 14, 15, with threaded tightening being preferred, but with lever clamp tightening also believed suitable. Such clamps are described and shown in U.S. Pat. Nos. 2,018,906, 2,403,449, 2,990,599, 4,307,495 and 5,010,626, 5,653,481 the complete contents of which are incorporated herein by reference. Briefly described, such band connectors 14, 15 are made of a band with apertures along at least a portion of its length, with a threaded screw device attached at one end such that the screw axis and the band axis are approximately parallel, but slightly offset from each other. The preferred apertures in the band are preferably about 0.035 to 0.045 wide in the axial direction along the length of the band, with the material between the apertures being about 0.06 wide. However, it should be understood that other dimensions are possible and may be acceptable so long as the strength and function of the band meets the functional requirements.

Further, in some versions of connectors 14, 15 comprising ring clamps or hose clamps that use threaded fasteners or lead screws to tighten the clamps, a narrow passage exists between the band encircling the pipe and the tightening screw that tightens or loosens the band, so that the free end of the band may be looped around and interposed through the passage, thus engaging the thread of the screw. However, the passage may be too thin to allow the thickness of the band to pass directly through without meeting with interference from the screw threads. The apertures in the band may be oriented at an angle corresponding to the pitch angle of the screw threads used to tighten the band clamp 14, so that the free end of the band may be advanced through the passage only by turning the screw, thereby progressively tightening the loop.

As used herein, hose clamp and band clamp are used interchangeably to refer to the same types and varieties of clamps that encircle sleeve 20 and the pipes 16, 18 to compress the sleeve against the pipes and form a fluid tight seal. One skilled in the art will recognize there are a wide variety of such clamps of various constructions. The various hose clamps and band clamps and other encircling devices that compress sleeve 20 against the pipe sections 16, 18 inside the sleeves 20 comprise means for fastening the proximal ends of the sleeves to the ends of the curved section to form a fluid tight seal and also comprise means for fastening the distal ends of the sleeves to the adjacent pipe sections to form a fluid tight seal.

Referring to FIGS. 1-9, the pipe connectors 14, 15 may be fastened to an end of strap 12 by any mechanism suitable for the load to be carried by strap 12 and transmitted to the connector 14. For smaller diameter pipes up to about four inches in diameter operating under internal pressures up to perhaps 50 psi to one hundred psi, one or more rivets are believed suitable to fasten the strap 12 to the connector 14. For larger diameter pipes, stronger connections may be used as discussed later. The straps 12 can be fastened to or connected to the pipe connectors 14, 15 through any suitably strong connection, including threading the straps through apertures, or by fastening the straps 12 to tabs 24 (FIGS. 10-11), or by crimping or swaging abutting parts together, or by knotting straps made of material suitable for knotting. The length of the straps 12*i*, 12*o* will vary, but strap 12*o* is long enough to extend along the outer contour of the pipe joint and strap 12*i* is long enough to form a chord length across the inner dimension of the bend, and both straps 12 allow the pipe connectors 14, 15 to fasten to the next segment of the pipe.

Referring to FIGS. 14-20, for larger diameter pipes the pipe connectors 14 need to be fastened more securely to the straps 12 and more than one clamp 22 may be used to ensure the joint connections and to help ensure the sealing sleeves 20 do not leak. For larger diameter pipes the inner strap 12*i* is made stronger by altering one or more of the strap material, width or thickness, or by using more than one strap and laying them on top of each other. Likewise, for larger pipes, the pipe connectors 14, 15 may be strengthened by increasing the strength of the material, width or thickness of the connectors.

Preferably, though, the connection of the strap 12 to the connector(s) 14, 15 for larger pipes uses an adjustable length connector which can tighten or loosen the strap 12 and thus increase or decrease the tension in the strap 12 and the force with which the pipes 18 are urged toward or against curved pipe 16. Preferably, a threaded fastener is connected to one or both ends of the strap 12 with the threaded fastener fastened to a connector 14 in a way allowing tightening or loosening of the strap.

The figures show each distal end of the strap folded back to form a loop of material enclosing part of a T bolt 30 with a suitably located hole in the bent-over end of the strap to accommodate the leg 32 of the T bolt while the strap encircles the remaining top of the T bolt. The bent over ends of the inner strap 12 can be fastened to the strap by bolts or rivets or spot welds 34 to hold the T bolt 30 in place. An L bolt could also be used as could other suitably strong alternative connections, which connections may vary with the nature of the strap 12.

The T bolt 30 may have threads 36 formed on at least a portion of the leg 32. The bolt 30 passes through an opening in the pipe connector 12i with a nut 36 preventing removal and fastening the strap to the connector. The outer strap 12o has a similar construction, the details of which are not repeated.

Advantageously, to accommodate larger forces in the straps 12, the pipe connectors 14, 15 may comprise a split ring connector (sometimes called a pipe clamp or riser clamp) having two parts 38L, 38R (Left & Right, respectively), each of which has a curved portion 40a, 40b and each of which has two distal end flanges 42a, 42b, extending generally radially outward. Bolts 42 through holes in the distal end flanges 42 clamp the aligned flanges together to fasten the connectors 14, 15 to one of the pipes 17 and in less desirable situations, to fasten to curved pipe section 16. It is possible, but less desirable, for the connectors 14, 15 on larger diameter pipes to also encircle a portion of the sealing sleeve 20. In use, the pipe connectors may comprise hose clamps with diameters of from 2-12 inches, and preferably of 4-10 inches, and also from 6-10 inches.

The T bolt 30 is fastened to the connector 14, 15. A boss or flange could be provided on the connector 14, 15. But preferably, at or near the juncture of the curved portions 40 and distal flanges 42 of each connector part 38L, 38R, is preferably (but optionally) formed a curved or inclined portion 44 which forms a portion of a passageway through which leg 32 of the T bolt 30 passes, with nut 36 fastening the end of the strap 12 to the connector 12. The bolt holding distal flanges 42a, 42b together is preferably close to the passageway formed by portions 44. The use of threaded bolt 30 and nut 36 allows adjustable tightening of the straps 12 and thus adjustable tension in the straps 12 and adjustment of the force with which the pipes 18 are urged toward the curved pipe 16. Other adjustable length and adjustable force connectors are suitable for use with strap(s) 12. There are thus provided means for adjusting the length and/or force or tension in the straps 12.

The strap 12 advantageously fastens at or adjacent to the outer surface of the pipe 16, 18 or at or near the inner or outer surface of sleeve 20 so as to reduce the twisting force exerted on the pipe connectors 14, 15 by the strap(s) 12. FIGS. 19 and 20 show the outer strap 12o offset from the curved pipe 16—for illustration. In use, the strap 12o would push against, contact or abut the outer surface of the center pipe 16 (directly or through some structure is interposed between the strap and the pipe).

Putting adjustable length mechanisms on the straps 12 allows the resistance to pipe separation to be adjusted and allows greater flow rates through the pipes 16, 18 and greater pressures in the pipes to be accommodated without separation and with no or acceptable leakage under such pressures. The adjustable length is shown as achieved by threaded fasteners, but other length adjustments can be used, included cam and lever mechanisms mounted to or connected to the pipe connectors 14, 15 and also connected to the strap 12. Likewise, threaded fasteners other than the depicted configuration could be used, including toggle bolts or shafts with threaded ends passing through bosses located on or openings through portions of the pipe connectors 14, 15.

For smaller diameter pipes 16, 18, the sealing sleeve 20 may optionally have integrally molded flat steel wires or straps which form ring clamps 22. For larger diameter pipes the tubular sealing sleeves 20 typically have multiple ring clamps 22 integrally molded into the sleeves 20. Such sleeves 20 with integrally molded ring clamps 22 are known in the prior art.

While using band clamps or split ring clamps to connect to the pipes 16, 18, or to compress sleeves 20 against the pipe sections 16, 18 are the preferred means for connecting the ends of straps 12 to the pipe segments 16, 18, various other means of attaching the straps 12 to the pipe segments can be used, including threaded fasteners passing through the straps or connectors to the pipes 18 or a boss on the pipes bolted or otherwise fastened to the straps, spot welding the straps or connectors to the pipes, adhesive bonding, rivets, shackles, or loops made of any suitable material (metal or non-metal) fastened to the pipes 18. There are thus provided means for fastening the straps 12i, 12o to the adjacent pipe sections 18a, and 18b.

Figure 19A:
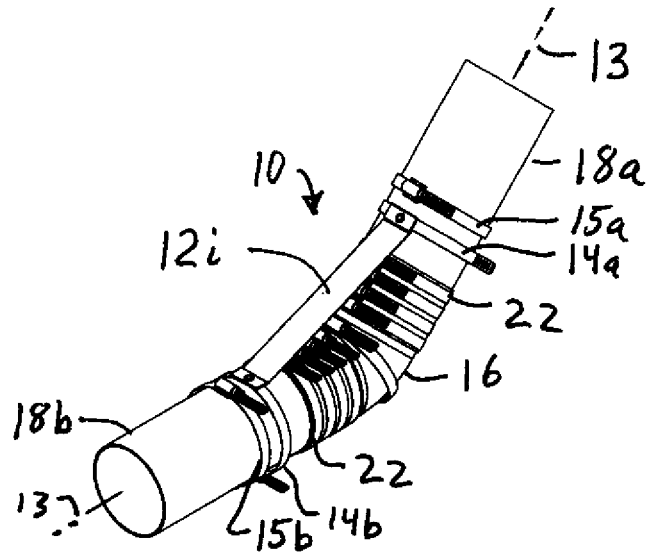
FIG. 19A is a perspective view of a 45 degree pipe joint showing the inner strap.
Figure 20A:
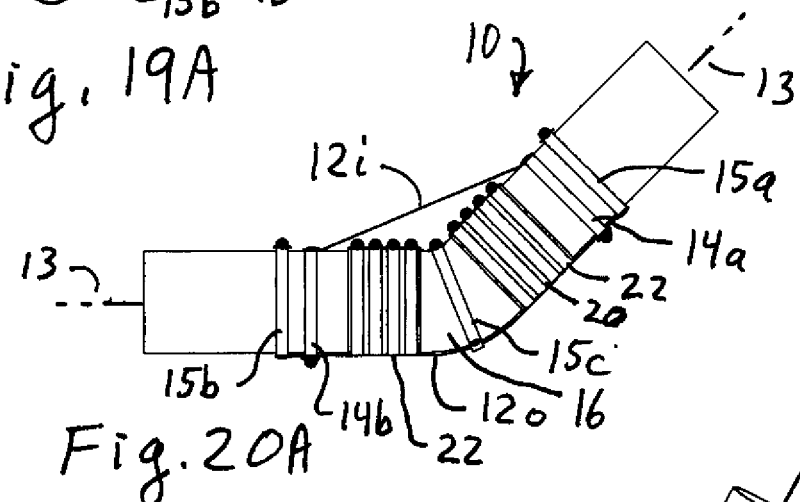
FIG. 20A is side view of the pipe joint of FIG. 19A.
Figure 21:
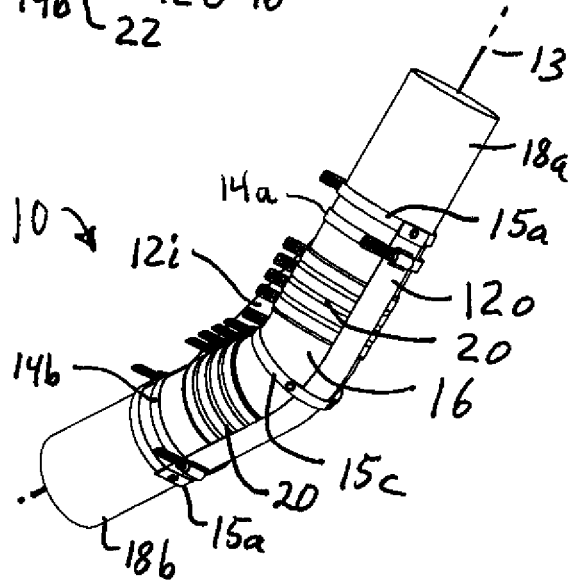
FIG. 21 is a back side perspective view of the pipe joint of FIG. 19A, showing the outer strap.

Referring to FIGS. 19A, 20A and 21, a 45° pipe joint is shown. The location of the inner and outer straps 12i, 12o, respectively, are as described earlier. The remaining parts of the pipe joint 10 are as described earlier and that description is not repeated. FIG. 21 shows the pipe connectors 14a, 14b as overlapping outer strap 12o. Depending on the configuration of pipe connectors 14 and strap 12o, the pipe connectors 14 may fit underneath the outer strap 12o or they may pass over other strap 12o and push it against the adjacent pipe 18. Preferably the pipe connectors 15 pass over the outer strap 12o and press the strap against the pipe 18 to help hold the outer strap in position.

Figure 22:
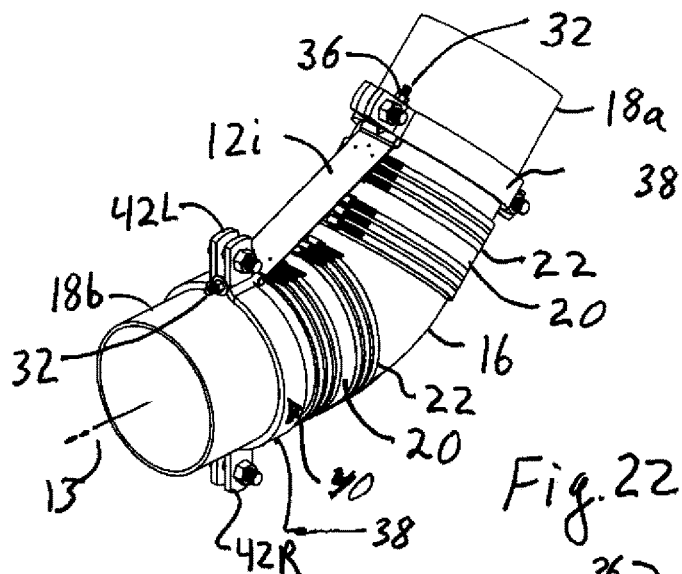
FIG. 22 is a perspective view of a 45 degree pipe joint with two pipe connectors showing the inner strap.
Figure 23:
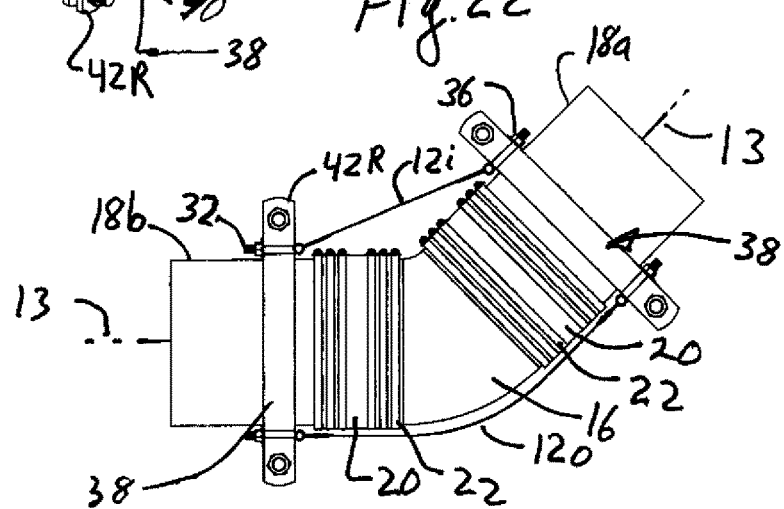
FIG. 23 is a side plan view of the pipe joint of FIG. 22.
Figure 24:
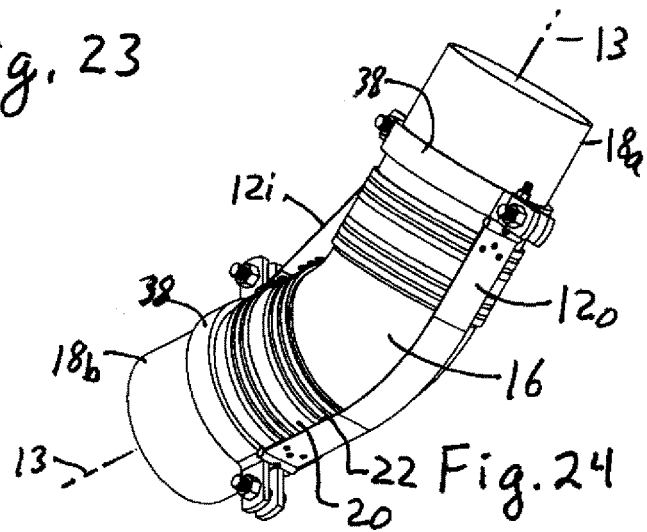
FIG. 24 is a back side perspective view of the pipe joint of FIG. 22 showing the outer strap.

Referring to FIGS. 22-24 an embodiment is shown in which the inner and outer straps are connected to the same pipe connectors, shown as pipe connectors 38. The pipe connector could be as described for connector 14, 15 or for connector 38. The location, construction and use of the various parts is as previously described and is thus not repeated in detail. The straps 12i and 12o each have distal ends connecting to the same pipe connector 38, on opposing sides of the connectors. Adjustable length or tensioning mechanisms on the straps 12 are provided by the threaded leg 32 passing through the pipe connector and held by nut 36 from pulling away from the pipe connector 38.

Figure 25:
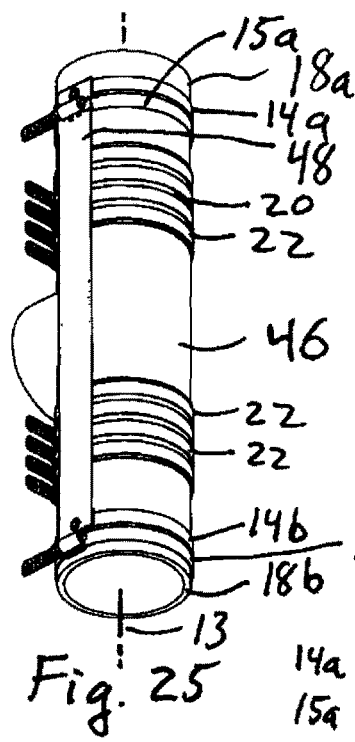
FIG. 25 is a back side perspective view of a T-joint using the straps and pipe connectors of this invention.
Figure 26:
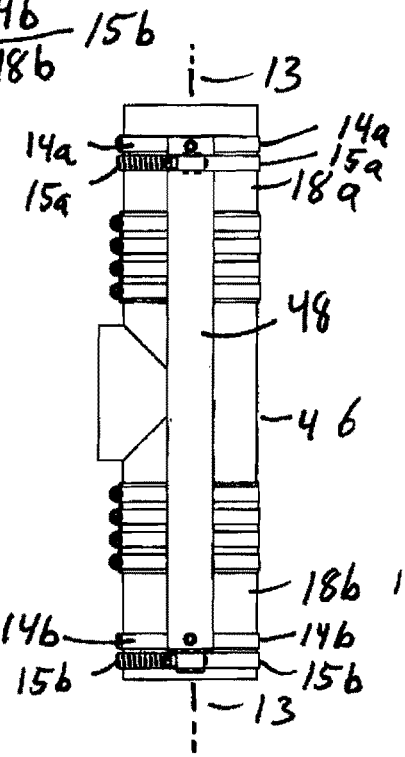
FIG. 26 is a side plan view of the T-joint of FIG. 25 with the opposing side being a mirror image thereof.
Figure 27:
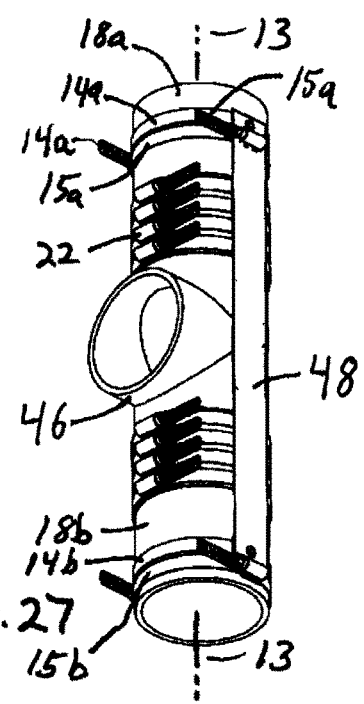
FIG. 27 is a front side perspective view of the T-joint of FIG. 25.

Referring to FIGS. 25-27, a T joint or T-fitting is shown in which adjacent pipe sections 18a, 18b are joined to opposing ends of a T-fitting 46. Sleeve 20 and clamps 22 provide a fluid tight connection between adjacent pipe sections 18a, 18b, as previously described. In the above pipe joints, the inner strap 12i extended across open space between two pipe sections 18 that were inclined relative to each other, which outer strap 12o followed the contour of the pipe joint and typically abutted the pipe, sleeves and sealing clamps. In the joint of FIGS. 25-27, the joined pipe sections 18 are aligned so the straps 12 are each more akin to the outer straps 12o. The two straps 12 are on opposing sides of the pipe joint so the inside and outside nomenclature for a curved joint is not as apparent, although the straps are the same as previously described, as are the remaining parts of the pipe joint. The repeated parts of the pipe joint are not again described but the same numbers are used for the same parts. For ease of reference the strap closest to the viewer in the first image will be referred to as the first strap 48 and the other strap will be referred to as the second strap 50. Except for changing the names or numbers, the straps 48, 50 are the same as the straps 12. A connector 14 is fastened to each end of first strap 48, and a connector 15 is fastened to each end of second strap 50. The connectors 14, 15 are as described above and can include the split ring connector and other connector variations.

The T fitting 46 forms a straight flow axis along longitudinal axis 13, and the length of the straps 48, 50 are preferably in the same plane as the centerline of that flow path and longitudinal axis, on diametrically opposing sides of the pipes 18a, 46, 18b. First strap 48 is thus shown, with second strap 50 on the opposing side but not readily visible in the figures but opposite to the first strap. The pipe connectors are staggered, so that each strap 48, 50 is slightly offset along the length of the longitudinal axis 13. This allows the straps 48, 50 to be the same length. Alternatively, one strap 48, 50 could be shorter so both of its pipe connectors 14 or 15 could fit inside the other pipe connectors 15 or 14. The strap 48, 50 on the most distal connector 14, 15, the one closest to the adjacent end of pipe section 18a, 18b, preferably overlaps the strap connected to the less distal connector.

As in the other embodiments, the straps 48, 50 restrain the adjacent pipe sections 18a, 18b from moving away from the T fitting 46. In this configuration the straps restrain opposing sides of each adjacent pipe section 18a, 18b. If the straps 48, 50 do not fasten to the pipe sections 18 on diametrically opposing sides, then the pipe sections 18 may tilt under pressure, leading to leakage or joint separation. While not shown, any of the adjustable connector discussed herein which vary the length of the straps 48, 50 or the tension in those straps, can also be used. In this pipe joint, the centerline of the flow path 13 is substantially straight and the straps 48 form first and second straps that are substantially parallel along a substantial portion of the length of the first and second straps. Substantial means half or more.

Referring to FIGS. 28-30, a San-Tee pipe joint using San-Tee connector 52 is shown joined to adjacent pipe sections 18a and 18b centered on longitudinal axis 13, and perpendicular pipe section 18c which is orthogonal to the flow path along axis 13 and which extends along axis 53. Sleeves 20 and clamps 22 join the adjacent pipe sections 18a, 18b, and 18c to the three ends on the San-Tee connector 52. A first strap 48 has a first connected to a first connector 14a that encircles and engages (or otherwise connected to) adjacent pipe 18a. Strap 48 has a second end 50 connected to a second connector 14b that encircles and engages (or is otherwise connected to) adjacent pipe 18b. The connectors 14 could encircle and fasten to the sleeves 20, but that is not preferable. The depicted strap 48 for the San-Tee joint has pipe connectors 14a, 14b toward the distal ends of the adjacent pipe sections 18a, 18b, but the connectors could be on the sleeves 20 or next to the sleeves on the proximal ends of the pipe sections.

A second strap 50 has a first connector 15a that encircles and engages (or is otherwise connected to) the perpendicular portion 54 of the San-Tee section 52. It is possible, but not shown, to have an inner strap 12i extend between the perpendicular portion 54 and adjacent section 18a or 18b.

The first strap 48 has a length that extends along the center of flow path 13 is that is preferably also in the plane through axes 13, 53. That location is believed to reduce twisting or canting of the adjacent pipe sections 18a, 18b caused by the strap 48. Likewise, second strap 50 preferably extends along a line parallel to the center of flow path 53, and advantageously is in the plane thorough axes 13, 53. Alternatively, it is believed suitable to have second strap 50 located in a plane orthogonal to flow axis 13 and containing axis 53, and extend from one side of the adjacent pipe section 18c, around the curved portion of San-Tee fitting 52, and fasten to the same pipe connector 15a or 15b. In this alternative configuration both ends of the strap 50 attach to the same pipe connector.

In use, the straps 48, 50 help maintain the position of the pipe sections 18 relative to fitting 52 and restrain movement of the adjacent pipe sections away from the San-Tee fitting 52. The location of the straps 48, 50 are preferable such that the forces on the adjacent pipe segments 18 are symmetrical and/or reduce canting. The straps 48, 50 on the San-Tee fitting 52 are not symmetrical and that is because flow direction causes tilting in the direction opposed by the straps 48, 50. It is advantageous to provide further straps from the adjacent pipe section 18c to the fitting 52 or the adjacent sections 18a, 18b, but that is optional.

Referring to FIGS. 31-33, a reducer pipe fitting 62 is shown in which pipes of larger and smaller diameters are joined by a reducer fitting 62. The reduction pipe joint 56 has a first larger diameter end 58 sized to fit a larger pipeline, and a smaller diameter end 60 sized to fit a smaller diameter pipeline. A flat or tapered transition section 62 connects the two diameters. The flow is usually from the larger diameter to the smaller diameter pipe. A larger diameter adjacent pipe section 18a is connected to the larger diameter end 58 of the reducer fitting 62 by a larger diameter sleeve 20 and clamps 22. A smaller diameter sleeve 20 and clamps couple the smaller diameter end 60 of the reducer 56 to the smaller diameter adjacent pipe section 18b.

The arrangement is much like that of the straight pipe section of FIG. 27 except that the straps 48, 50 bend to conform to the change in diameter of the joined pipe sections. First strap 48 has a first end connected to first clamp 14a that encircles or otherwise joins to adjacent pipe segment 18a. Strap 48 has a second end connected to a second clamp 14b that encircles or otherwise joins to adjacent pipe segment 18a. Opposite strap 48 is strap 50, with pipe connector 15a connected to the larger pipe section 18a. Pipe connector 15b connects to the smaller pipe section 18b. In the depicted embodiment the straps 48, 50 are staggered so the strap 48 is closer to the transition section 62 at the larger end of the pipe 18a but further from the transition section at the smaller end 18b, with the pipe connector 15b encircling and located on top of the strap 48 at the smaller diameter end 18b.

The Straps 48, 50 each bend at the reduction in diameter at transition section 62 where the larger diameter of pipe section 18a ends and the reduction in diameter accompanying transition section 62 begins. Thus, each strap 48, 50 is on the inside of a pipe connector on the other strap, at one end of the pipe joint. In this embodiment, the flow path centerline 13 is substantially straight and the first and second straps 48, 50 are substantially parallel for a portion of the length of the straps (along the larger diameter pipe section 18a), and are inclined toward each other for a portion of the length of the straps (across transition fitting 62.

Figure 34:
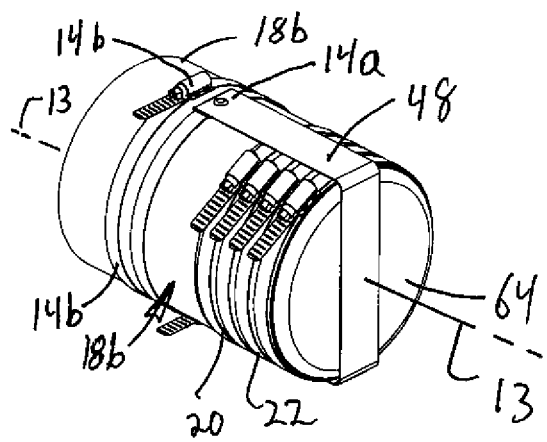
FIG. 34 is a front side perspective view of a blind end pipe joint using the straps and pipe connectors of this invention.
Figure 35:
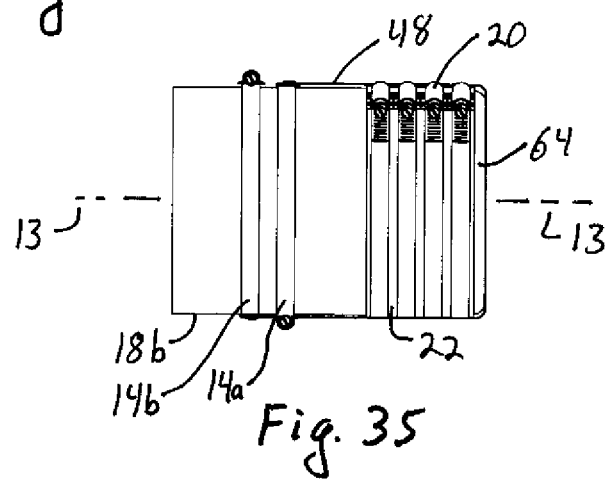
FIG. 35 is a side plan view of the blind end pipe joint of FIG. 34.
Figure 36:
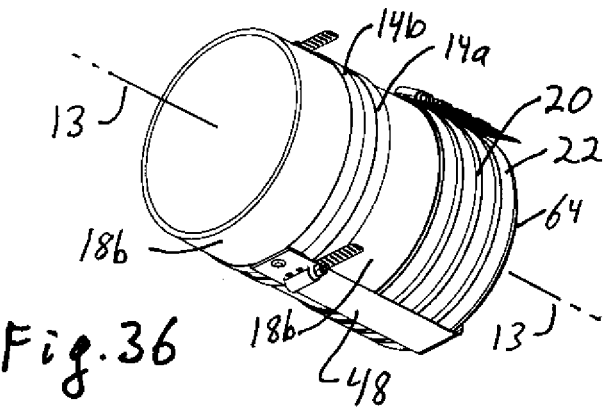
FIG. 36 is a back side perspective view of the blind end pipe joint of FIG. 34.

Referring to FIGS. 34-36, an end of line plug or blind cover 64 has sleeve 20 and clamps 22 fastening the blind cover 64 to the pipe 18b. The blind cover 64 can take various forms and is shown here as a cup-shaped piece that fits over the end of the pipe section 18b and is clamped to the pipe section 18b by clamps 22. The cover 64 could take other forms, including a disc-shaped part with a threaded periphery or stepped periphery that mates with the end of pipe section 18b in which case the sleeve 20 and clamps 22 may be omitted. Strap 48, having a connectors 14a, 14b at opposing ends of the strap, passes over the end of the pipe section 18b blocked by blind cover 64 to restrain that cover 64 from moving along flow path 13. The pipe connectors 14a, 14b are adjacent each other and staggered so one strap is closer to the end of pipe section 18b than the other pipe connector, with one pipe connector encircling a portion of the strap 48 and pressing it against the outer surface of the pipe section 18b. Note that the flow path ends at the blind cover 64 when the cover is in place, but that a flow path is still defined to the blind cover and may pass the blind cover when the cover is removed, as for cleaning or access to the pipeline.

A second strap 50 (not shown) could be used if additional restraining force is needed, with the second strap orientated 90 degrees relative to the first strap 48. Advantageously, the strap 48 (or 50) has a length or tension adjusting device described earlier, but not shown in FIGS. 34-36. Thus, the amount of restraining force on the end of the blind section 64 can be adjusted by such tension adjusting mechanisms and means.

Referring to FIGS. 37-39, a Y fitting or wye fitting 66 is shown with first and second branches 68, 70 and a leg or base section, each of which is connected to an adjacent pipe section 18a, 18b and 18c by sleeves 20 and fittings 22 as described above. Pipe sections 18a and 18b are on the same substantially straight flow path along centerline 13. Typically, the branches of the Y fitting 66 are about 45 degrees apart, but the angles can vary. In the depicted Y fitting, there is a straight through flow path along axis 13 and one branch at 45° to that flow path along axis 53.

Preferably, but optionally, each adjacent pipe section 18a, 18b, 18c has two opposing straps 48, 50 restraining the pipe section from moving away from the Y pipe fitting 66 under fluid pressure, or from tilting or canting away from the flow axis under pressure. Each strap has a pipe connector 14a, 14b or 15a, 15b at each end of the strap, where the connectors are described as above. Because of the geometry, some of the straps may connect to one of an adjacent pipe section 18a, 18b, 18c, or they may connect to the joint fitting 66. The pipe straps and fittings have the construction as described above and elsewhere herein, and the details of that construction are not repeated.

First strap 68 extends along between adjacent pipe sections 18a, 18b on flow axis 13, with first pipe connector 15a connecting to adjacent pipe section 18a, and second pipe connector 15b connecting to adjacent pipe segment 18b. The first strap 68 extends along the two pipe sections 18a, 18b and along the fitting 66, and could optionally be connected to the fitting as described above. Second strap 70 extends from first adjacent pipe section 18a to the third adjacent pipe section 18c, with pipe connectors 14a, 14b encircling or otherwise connected to adjacent pipe sections 18a and 18c, respectively. The strap 70 corresponds to an inner strap 12i since it extends between two adjacent pipe sections 18a, 18c that are inclined to each other and strap 68 corresponds to outer strap 12o since it follows the outer periphery of the adjacent pipe sections 18a, 18b and the intervening pipe fitting 66.

Diametrically opposite the connection of second strap 70 with third adjacent pipe section 18c, is a third strap 72, extending along adjacent pipe section 18c to fasten to the wye fitting or fitting 66. Pipe fittings 15a, 15b extend from the same side of strap 72. Pipe fitting 15b encircles the end of strap 70 next to the pipe connector 14b. Depending on the ordering of the straps and the adjustment or tightening mechanisms, different straps may pass underneath different pipe connectors.

Diametrically opposite the connection of first strap 68 to the adjacent pipe section 18b, is fourth strap 74 which extending along the second adjacent pipe section 18b to the fitting 66. Pipe connectors 14 or 15 on each end of strap 74 couple the respective ends of the strap 74 to the adjacent pipe section or fitting. In the depicted embodiment the strap 74 has one end connected to pipe connector 14b which encircles adjacent pipe section 18b, and the other end is connected to pipe connector 14a which encircles the other branch of the Y fitting 66 and its associated central path 53. The pipe connector 14a encircles and passes over part of the strap 72.

The strap 74 corresponds to an inner strap 12i since it extends across a gap or space between an adjacent pipe section 18c and a branch of fitting 66, and strap 72 corresponds to outer strap 12o since it follows the outer periphery of the adjacent pipe section 18c and its juncture with pipe fitting 66.

All of the straps 68, 70, 72, 74 preferably have the length of the strap located in the plane passing through centerlines of the flow paths of axes 13 and 53. That way each adjacent pipe section 18a, 18b, 18c is urged against or toward fitting 66 by symmetric forces. Advantageously, but optionally, the straps 66, 70, 72, 74 have length adjustment mechanisms on them to vary the force or length in the respective straps. It is believed that the straps 70, and possibly straps 72 and 74, could be omitted, depending on the orientation of the Y fitting 66 and the flow through the fitting.

Figures 40, 42:
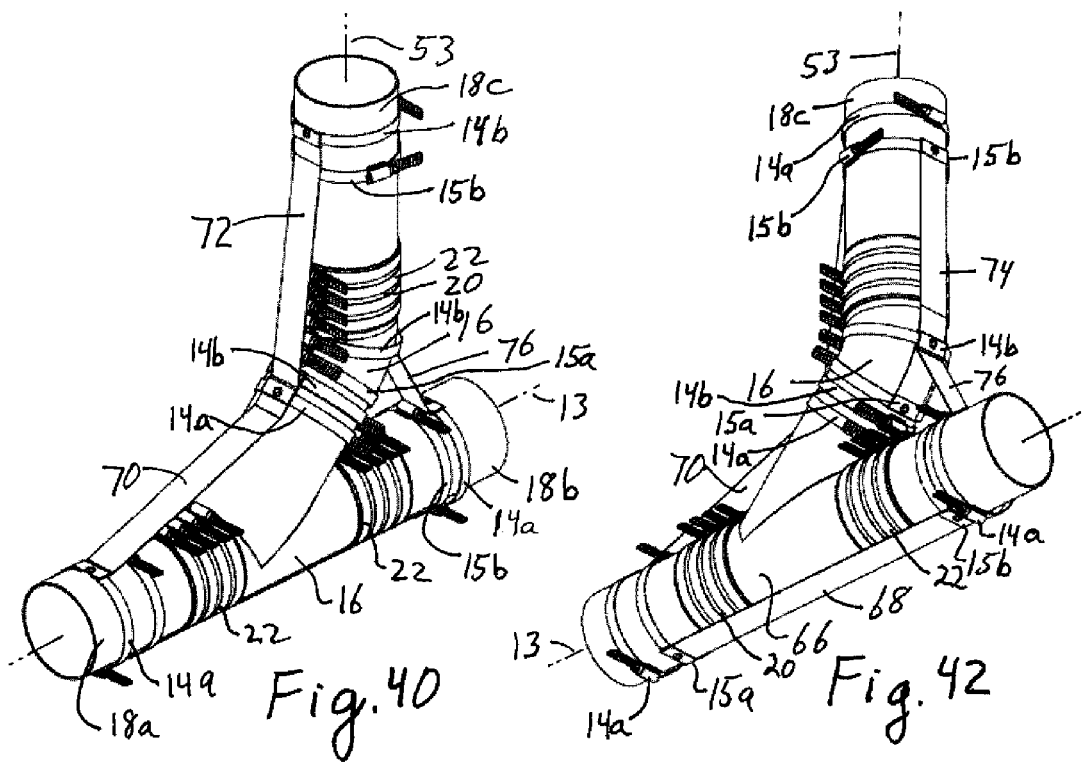
FIG. 40 is a front perspective view of a pipe joint having a Y or wye connector with a straight pipe section on one branch of the wye and on the leg or base of the wye, and a curved pipe section joining a straight pipe section on the other branch of the wye.
FIG. 42 is a lower back perspective view of the pipe joint of FIG. 40
Figure 41:
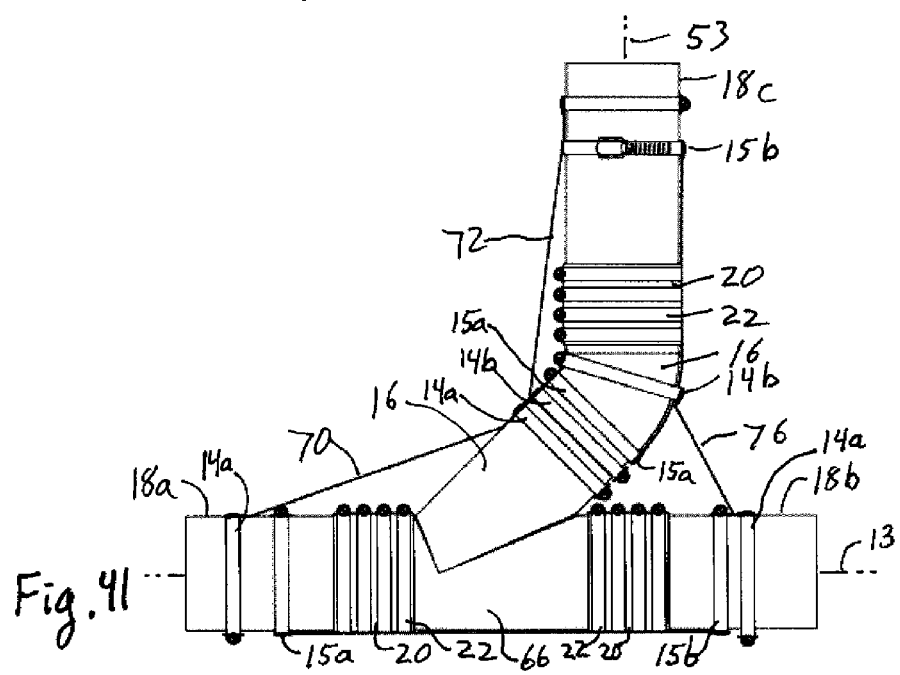
FIG. 41 is a side plan view of the pipe joint of FIG. 40.

Referring to FIGS. 40-42, the Y or wye pipe fitting 66 is shown with a straight pipe section 18a, 18b connected to the pipe fitting 66 along straight flow path 13. Curved pipe fitting 16 (⅛ bend) connects to the other branch of the Y fitting 66, with a straight pipe section 18c connected to the curved fitting 16 so that the flow path through that branch along centerline axis 53 is ultimately perpendicular to flow path 13. Tubular sleeves 20 and clamps 22 provide fluid tight seals across the various pipe joints.

First strap 68 has first pipe connector 15a (left end) encircling or otherwise connected to first adjacent pipe section 18a. At the opposing end of strap 68 is second pipe connector 15b encircling or otherwise connected to second adjacent pipe section 18b. Strap 68 passes along and could optionally be fastened to fitting 66. The second adjacent pipe section 18b is also connected to the other branch of the Y fitting 66 by strap 76 with one pipe connector 14a on end 18b, and the other pipe connector 14b encircling the other branch of the Y fitting 66, with strap 76 extending between those pipe connectors. The strap 76 and connectors 14a, 14b are analogous to the inner strap 12o since it spans the space between parts, while strap 68 is analogous to strap 12o and its connectors 15a, 15b which follows the contour of the pipe joint.

Diametrically opposite strap 68 is strap 70 which connects to first adjacent pipe section 18a and the inclined branch of the Y fitting 66 through pipe connectors 14a (on pipe section 18a) and 14b (on fitting 66). The strap 70 and pipe connectors 14 correspond to inner strap 12i since it extends across a space between parts of the pipe joint.

A third strap 72 connects the branch of the Y fitting 66 to the third pipe section 18c, through pipe connectors 14a, 14b, respectively, each encircling or otherwise connected to the pipe fitting 66 and pipe section 18c, respectively. The pipe connector 14a on this strap 72 passes over the strap 70 as best seen in FIG. 40. Diametrically opposite and substantially parallel to strap 72 is fourth strap 74 extending between the adjacent pipe section 18c and the wye fitting 66, through pipe connectors 15a, 15b. The straps 72, 74 correspond to straps 12i and 12o in the above described embodiments. A fifth strap 76 described above is provided between the pipe section 18*b* and the adjacent branch of the Y fitting 66. The pipe connector 14*b* on strap 76 passes over the strap 74.

The straps 68, 70, 72, 74 and 76 preferably have a length extending in a common plane, which plane also contains flow axes 13, 53. As with the other embodiments, the straps and connectors urge the adjacent pipe sections 18 (and any intervening pipe fittings) toward the main pipe fitting (here Y fitting 66) to prevent or reduce splaying or movement of pipe sections away from the main fitting and thereby reduce leakage and/or breakage of the pipe joint. It is believed that straps 70 and 74 could be omitted in this embodiment, depending on the orientation of the Y fitting 66 and the associated pressures in the pipe joint. It is believed that a single strap with three pipe connectors could be used to replace straps 70, 72.

Referring to FIGS. 43-45, the Y or wye pipe fitting 66 is shown as described in FIGS. 40-42, but with a blind end 64 instead of the straight pipe section 18*b* connected to the pipe fitting 66 along straight flow path 13. First strap 68 has first pipe connector 15*a* encircling or otherwise connected to first adjacent pipe section 18*a*. At the opposing end of strap 68 is second pipe connector 15*b* encircling or otherwise connected to second adjacent pipe section 18*b*, which in this instance has a blind plug or blind end 64. Strap 68 passes along and could optionally be fastened to fitting 66. The blind end cap or plug 64 is also held closed by strap 68. The pipe connector 15*b* connects to the end of strap 68 (e.g., rivet) at a location between the two branches of the Y fitting, with the strap 68 passing over the end plug 64 (FIG. 45) and two opposing sides of the associated sealing sleeve 20, and then passes underneath the pipe connector 15*b* before extending across pipe fitting 66 to reach first pipe section 18*a* and its pipe connector 15*a*. The pipe connector 15*b* encircles or is otherwise connected to one branch of the Y fitting 66. The remaining parts may be as described regarding FIGS. 40-42.

There is thus provided a pipe joint in which one of the adjacent pipe sections comprises a blind end 64. The pipe connector 15*b* is connected adjacent an outlet of the pipe fitting 66 leading to the blind end 64, and the strap 68 crosses the blind end 64 and ends at the pipe connector 15*a*.

The straps and fittings provide means for restraining or limiting movement of pipe sections 18 or joined pipe fittings (e.g., 66 and 16) relative to a main pipe fitting 16, 66. The straps advantageously include an adjustable length mechanism to vary the tension or force exerted by the strap that resists movement of the pipe sections 18 or pipe fittings 16 to which the straps are connected. The pipe fittings 14, 15 preferably are also of adjustable length (or circumference or diameter) to allow the connectors to be used with variable diameter pipes, to fit over the ends of pipes, fittings and sleeves readily, and to compress sleeves 20 to assist in sealing if desired or if tight spacing requires placing the connector on a sleeve. Each of the straps (12, 48, 50, 68-76) has a length extending in a plane through a centerline (13, 53) of the flow path through the pipe joint.

The above description is given by way of example, and not limitation. Given the above disclosure, one skilled in the art could devise variations that are within the scope and spirit of the invention disclosed herein, including various ways of fastening the straps 12 to the connectors 14, 15 or of fastening the straps 12 to the hose clamps, whether or not the hose clamps are also used to seal sleeve 20 to the various pipes. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pipe joint having a first flow path with a first centerline passing through a first adjacent pipe section, a pipe fitting and a second adjacent pipe section so the pipe fitting separates the adjacent pipe sections, each adjacent pipe section being sealingly joined to the pipe fitting, the joint comprising:
    a first flexible strap extending between the adjacent pipe sections, the strap being sufficiently flexible that it can be coiled, the first strap having opposing ends each connected to a different one of a first and second pipe connector, on the same side of the first strap, each first and second pipe connector encircling and clamping to a different one of the first and second adjacent pipe sections, the first strap having a length extending in a first plane also containing the first centerline, further comprising a second flexible strap having a length extending in the first plane, the second strap having opposing ends each connected to a different one of a third and fourth pipe connector, the second strap connected at a location diametrically opposite the first strap to one of the first and second adjacent pipe sections, and the fourth pipe connector connected to either the other adjacent pipe section or to the pipe fitting.

2. The pipe joint of claim 1, wherein the fourth pipe connector connects to the other adjacent pipe section.

3. The pipe joint of claim 1, wherein at least one of the first and second straps further includes an adjustable length mechanism to tighten the at least one strap and urge the adjacent pipe section to which the adjustable length mechanism strap is connected toward the pipe fitting.

4. The pipe joint of claim 1, wherein the pipe fitting is curved and the second strap comprises an outer strap extending along an outer periphery of the curved pipe fitting, with the fourth pipe connector connected to the other adjacent pipe section.

5. The pipe joint of claim 1, wherein the centerline is substantially straight and the first and second straps are substantially parallel along a substantial portion of the length of the first and second straps.

6. The pipe joint of claim 1, wherein the pipe fitting is a reduction fitting with a centerline that is substantially straight and having two opposing ends of different diameter in order to connect to first and second pipe sections of different diameter during use of the pipe joint, and wherein the first and second straps are substantially parallel for a portion of the length of the straps, and are inclined toward each other for a portion of the length of the straps.

7. The pipe joint of claim 1, wherein the pipe fitting has a second flow path passing through the fitting and a third adjacent pipe section, the second flow path having a second centerline merging with the first centerline through a portion of the pipe fitting, and wherein the fourth pipe connector is connected to the third adjacent pipe section.

8. The pipe joint of claim 7, further comprising at least one additional strap having opposing ends each having one of fifth and sixth pipe connectors, with the fifth pipe connector fastened to the third adjacent pipe section and the sixth pipe connector fastened to the pipe fitting.

9. The pipe joint of claim 7, wherein one of the adjacent pipe sections comprises a blind end, with the fourth pipe connector connected to the blind end adjacent an outlet of the pipe fitting leading to the blind end and the second strap crossing the blind end and the pipe fitting.

10. The pipe joint of claim 1, wherein each end of the pipe connectors comprises a clamp encircling and clamped to the specified part of the pipe joint, and at least one end of each strap having an adjustable fastener to vary the length and tightness of the strap to which the adjustable fastener is connected.

11. The pipe joint of claim 1, wherein at least one of the pipe connectors encircles a tubular seal which joins the fitting to the adjacent pipe section.

12. The pipe joint of claim 1, wherein at least one of end the pipe connectors comprises a split ring clamp encircling the specified part of the pipe joint, and wherein at least one of the straps has an adjustable length fastener connecting the strap to the clamp in order to vary the tightness of that strap.

13. A kit for maintaining the position of pipe sections that are joined to a pipe fitting having a first flow path with a first centerline passing through first and second adjacent pipe sections during use, the pipe fitting separating the adjacent pipe sections during use, the kit comprising:
  a first flexible strap having opposing ends each of which is configured to be fastened to a first pipe connector extending from the same side of the first strap, each first pipe connector being of sufficient size to encircle a different one of the adjacent pipe sections during use, the first strap having a length sufficient to extend at least between the adjacent pipe sections in a straight line during use;
  a second flexible strap having opposing ends each of which is configured to be fastened to a second pipe connector and extending from the same side of the second strap, each second pipe connector being of sufficient size to encircle a different one of the adjacent pipe sections during use, one of the first and second flexible straps having a length sufficient to extend at least around an outer periphery of the pipe fitting and reach the adjacent pipe sections during use;
  wherein the first and second pipe connectors comprise adjustable diameter ring clamps.

14. The kit of claim 13, wherein the second strap further includes an additional pipe connector connected to the second strap and located between the ends of the second strap and extending from the same side of the second strap as the other second pipe connectors.

15. The kit of claim 14, wherein the additional pipe connector is movably connected to the second strap so it can be moved along a length of the second strap.

16. The kit of claim 13, wherein each strap has an adjustable length connector to vary the length of the strap.

17. The kit of claim 13, further comprising at least one tubular sealing sleeve and clamps to seal the sleeve against one of the adjacent pipe sections or pipe fitting during use.

18. A pipe joint having a first flow path with a first centerline passing through a first adjacent pipe section, a pipe fitting and a second adjacent pipe section so the pipe fitting separates the adjacent pipe sections, each adjacent pipe section being sealingly joined to the pipe fitting, the joint comprising:
  a first strap extending between the adjacent pipe sections, the first strap having opposing ends each connected to a different one of a first and second pipe connector, on the same side of the first strap, each first and second pipe connector encircling and clamping to a different one of the first and second adjacent pipe sections, the first strap having a length extending in a first plane also containing the first centerline;
  a second flexible strap having a length extending in the first plane, the second strap having opposing ends each connected to a different one of a third and fourth pipe connector, the second strap connected at a location diametrically opposite the first strap to one of the first and second adjacent pipe sections, and the fourth pipe connector connected to either the other adjacent pipe section or to the pipe fitting; and
  wherein at least one of end the pipe connectors comprises a split ring clamp encircling the specified part of the pipe joint, and wherein at least one of the straps has an adjustable length fastener connecting the strap to the clamp in order to vary the tightness of that strap along the length of the strap.

19. A pipe joint having a first flow path with a first centerline passing through a first adjacent pipe section, a pipe fitting and a second adjacent pipe section so the pipe fitting separates the adjacent pipe sections, each adjacent pipe section being sealingly joined to the pipe fitting, the joint comprising:
  a first strap extending between the adjacent pipe sections, the first strap having opposing ends each connected to a different one of a first and second pipe connector, on the same side of the first strap, each first and second pipe connector encircling and clamping to a different one of the first and second adjacent pipe sections, the first strap having a length extending in a first plane also containing the first centerline;
  a second flexible strap having a length extending in the first plane, the second strap having opposing ends each connected to a different one of a third and fourth pipe connector, the second strap connected at a location diametrically opposite the first strap to one of the first and second adjacent pipe sections, and the fourth pipe connector connected to either the other adjacent pipe section or to the pipe fitting; and
  each end of the pipe connectors comprising a clamp encircling and clamped to the specified part of the pipe joint, and at least one end of each strap having an adjustable fastener to vary the length and tightness of the strap to which the adjustable fastener is connected.

20. The pipe joint of claim 19, wherein the first strap is flexible.

21. A pipe joint having a first flow path with a first centerline passing through a first adjacent pipe section, a pipe fitting and a second adjacent pipe section so the pipe fitting separates the adjacent pipe sections, each adjacent pipe section being sealingly joined to the pipe fitting, the joint comprising:
  a first strap extending between the adjacent pipe sections, the strap being sufficiently flexible that it can be coiled, the first strap having opposing ends each connected to a different one of a first and second pipe connector, on the same side of the first strap, each first and second pipe connector encircling and clamping to a different one of the first and second adjacent pipe sections, the first strap having a length extending in a first plane also containing the first centerline; and
  a second flexible strap having a length extending in the first plane, the second strap having opposing ends each connected to a different one of a third and fourth pipe connector, the second strap connected at a location diametrically opposite the first strap to one of the first and second adjacent pipe sections, and the fourth pipe connector connected to either the other adjacent pipe section or to the pipe fitting.

22. A pipe joint having a first flow path with a first centerline passing through a first adjacent pipe section, a pipe fitting and a second adjacent pipe section so the pipe fitting separates the adjacent pipe sections, each adjacent pipe section being sealingly joined to the pipe fitting, the joint comprising:

a first flexible strap extending between the adjacent pipe sections, the strap being flexibility sufficient that a user may generally conform the shape of the strap to a curved pipe joint, the first strap having opposing ends each connected to a different one of a first and second pipe connector, on the same side of the first strap, each first and second pipe connector encircling and clamping to a different one of the first and second adjacent pipe sections, the first strap having a length extending in a first plane also containing the first centerline, further comprising a second flexible strap having a length extending in the first plane, the second strap having opposing ends each connected to a different one of a third and fourth pipe connector, the second strap connected at a location diametrically opposite the first strap to one of the first and second adjacent pipe sections, and the fourth pipe connector connected to either the other adjacent pipe section or to the pipe fitting.

23. The pipe joint of claim 22, wherein the first and second flexible straps are flat metal straps.

24. The pipe joint of claim 22, wherein the first and second flexible straps is are curved across a width of the strap.

* * * * *